US011165748B1

(12) United States Patent
Thubert et al.

(10) Patent No.: US 11,165,748 B1
(45) Date of Patent: Nov. 2, 2021

(54) NETWORK SECURITY FROM HOST AND NETWORK IMPERSONATION

(71) Applicant: Cisco Technology, Inc., San Jose, CA (US)

(72) Inventors: Pascal Thubert, Roquefort les Pins (FR); Eric Levy-Abegnoli, Valbonne (FR); Jonas Zaddach, Antibes (FR); Patrick Wetterwald, Mouans Sartoux (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/069,579

(22) Filed: Oct. 13, 2020

(51) Int. Cl.
*G06F 15/16* (2006.01)
*H04L 29/12* (2006.01)
*H04L 12/751* (2013.01)
*H04L 29/06* (2006.01)

(52) U.S. Cl.
CPC ............ *H04L 61/302* (2013.01); *H04L 45/02* (2013.01); *H04L 61/3005* (2013.01); *H04L 63/062* (2013.01); *H04L 61/6022* (2013.01)

(58) Field of Classification Search
None
See application file for complete search history.

(56) References Cited

U.S. PATENT DOCUMENTS

| 8,000,698 | B2 | 8/2011 | Wolman et al. |
| 8,171,032 | B2 * | 5/2012 | Herz ................... H04N 21/252 707/748 |
| 8,892,135 | B2 | 11/2014 | Werb et al. |
| 9,143,839 | B2 * | 9/2015 | Reisman ................ H04N 21/25 |
| 10,268,390 | B2 * | 4/2019 | Warfield ............... G06F 3/0655 |
| 2002/0133607 | A1 * | 9/2002 | Nikander ........... H04L 63/0823 709/229 |
| 2015/0280916 | A1 * | 10/2015 | Bjarnason ............. H04L 9/3213 726/1 |

(Continued)

FOREIGN PATENT DOCUMENTS

WO    WO-2020206370 A1 *  10/2020  ......... H04L 63/0869

OTHER PUBLICATIONS

Ahmad AlSa'deh et al., "Secure Neighbor Discovery: Review, Challenges, Perspectives, and Recommendations", IEEE Computer and Reliability Societies, 2012, pp. 26-34.*

(Continued)

*Primary Examiner* — Phyllis A Book
(74) *Attorney, Agent, or Firm* — Lee & Hayes, P.C.

(57) ABSTRACT

Systems and methods may include sending, to a network registrar, an extended duplicate address request (EDAR) message including a first nonce generated by a host computing device, and receiving, from the network registrar, an extended duplicate address confirmation (EDAC) message including a second nonce, the second nonce being signed by the network registrar via a private key of a first public key infrastructure (PM) key pair of the network registrar via a first signature. The method further includes sending a first neighbor advertisement (NA) message to the host computing device including the second nonce. The second nonce and the private key of the network registrar verifies the first signature from the network registrar, the verification of the first signature indicating that the router is not impersonating the network.

20 Claims, 9 Drawing Sheets

(56) References Cited

U.S. PATENT DOCUMENTS

| | | | |
|---|---|---|---|
| 2016/0277391 A1* | 9/2016 | Choyi | H04L 67/12 |
| 2017/0132621 A1* | 5/2017 | Miller | G06Q 20/065 |
| 2017/0289138 A1* | 10/2017 | Ben-Shalom | H04L 63/065 |
| 2018/0041484 A1* | 2/2018 | Gifford | H04L 9/0891 |
| 2020/0186362 A1 | 6/2020 | Thubert et al. | |

OTHER PUBLICATIONS

P. Thubert, Ed., et al., "Address Protected Neighbor Discovery for Low-power and Lossy Networks," published Jan. 6, 2020, 19 pages.
Zhang, et al., "TRDP: A Trusted Router Discovery Protocol," IEEE publication Oct. 2007, 6 pages.

* cited by examiner

NETWORK SECURITY FROM HOST AND NETWORK IMPERSONATION

TECHNICAL FIELD

The present application generally relates to data communication networks. In particular, the present application relates to systems and methods for providing cloud-native network security and allowing a host device to securely verify that the host is joining an appropriate network by ensuring that the host has not joined the network via a rogue routing device that is impersonating the appropriate network and to ensure that the host is authorized through a challenge presented by an edge router.

BACKGROUND

A computer network is a geographically distributed collection of nodes interconnected by communication links and segments for transporting data between the nodes (e.g., computing devices), such as servers, routers, endpoints, and hosts. An administrator may desire to ensure that the network to which a host computing device is joining is an intended network. Likewise, a number of routers and servers within the network may seek to authenticate the host to ensure the host is authentic and that the host computing device is the device the host computing device asserts it to be.

Neighbor discovery (ND) protocols are protocols in the Internet protocol suite used with Internet protocol version 6 (IPv6). ND protocols operate at the link layer of the Internet model and are responsible for gathering various information required for Internet communication. The information required for Internet communication may include the configuration of local connections and the domain name servers and gateways used to communicate with more distant systems. ND protocols may include registration extensions for IPv6 over a low-power wireless personal area network (6LoWPAN). RFC 8505 is a host computing device to router interface that enables the host computing device to request routing services. RFC 8505 is referenced by a revision to the IEEE 802.11 protocols as the interface for IPv6 ND proxy and for host route injection in a routing protocol for low-power and lossy (RPL) networks. Further, in the case of cloud networking, the RFC 8505 defines a host to router interface to the Internet Engineering Task Force (IETF) routing protocol for cloud underlay referred to as routing in fat trees (RIFT). However, RFC 8505 is not self-secured and relies on lower layer security. Under these and other current protocols, the host computing device is not protected against a router being a rogue routing device that may impersonate the network the host computing device seeks or intends to join. Further, these and other current protocols, do not ensure that the network devices such as routers, registrars, and servers are able to confirm that the host computing device is, in fact, the computing device the host computing device purports to be.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
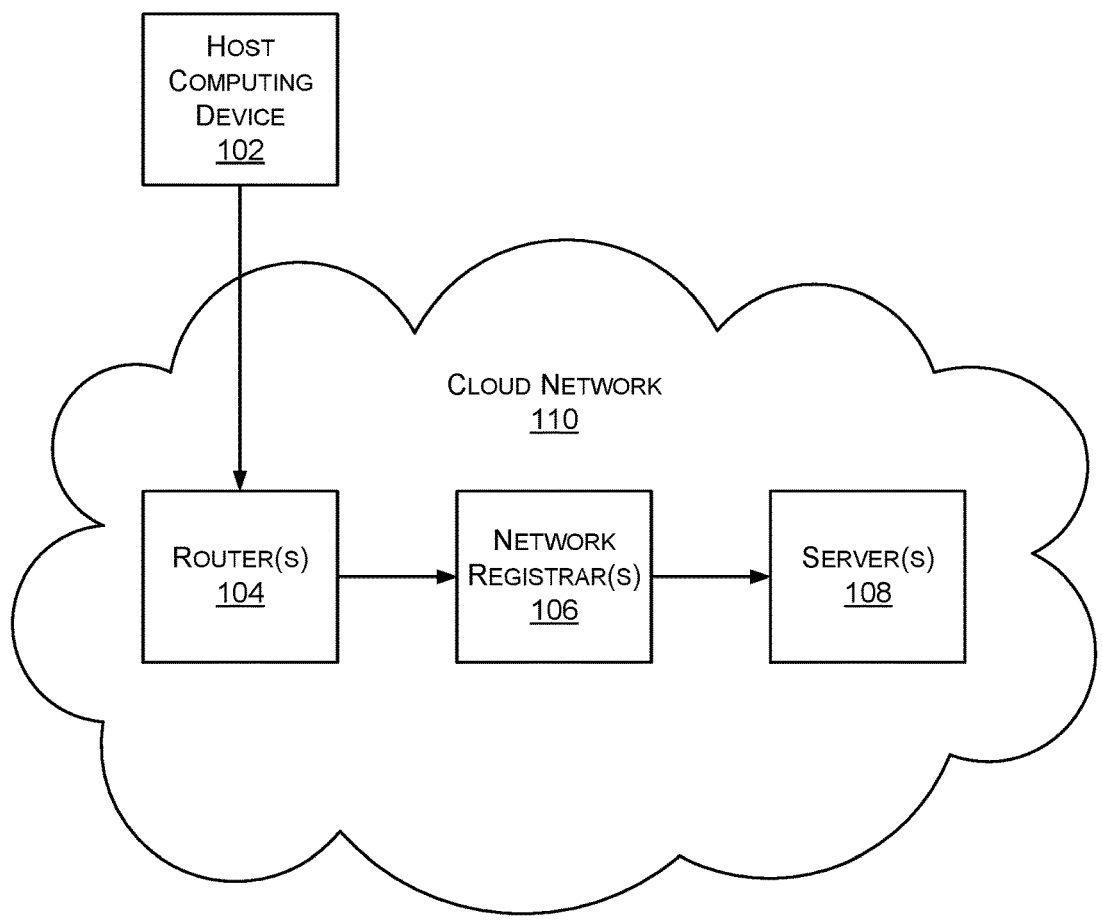
FIG. 1 schematically illustrates a system-architecture diagram of network for host and network verification, according to an example of the principles described herein.

The methods and protocols described in RFC 8505 include descriptions regarding a host to router interface that enable the host to request routing services. However, RFC 8505 does not describe the methods the host may use to prove to a router device and/or server device that the host is the owner of an address (e.g., an internet protocol (IP) address and/or a media access control (MAC) address) and to prove to the host and/or other networked devices (e.g., the router device and/or the server device) that the host has joined the right network.

RFC 8505 updates RFC 6775 titled Neighbor Discovery Optimization for IPv6 over Low-Power Wireless Personal Area Networks (6LoWPANs), to clarify the role of the protocol as a registration technique and simplify the registration operation in 6LoWPAN routers, as well as to provide enhancements to the registration capabilities and mobility detection for different network topologies, including the routing registrars performing routing for host routes and/or proxy neighbor discovery (ND) in a low-power network. RFC 8505 and RFC 6775 are incorporated herein in their entireties.

IPv6 Low-Power and Lossy Networks (LLNs) support star and mesh network topologies, and 6LoWPAN ND provides a registration mechanism and a central IPv6 ND registrar to ensure unique addresses. The 6LoWPAN ND mechanism reduces the dependency of the IPv6 ND protocol on network-layer multicast and link-layer broadcast operations. RFC 8505 simplifies and generalizes registration in 6LoWPAN Routers (6LRs) by modifying and extending the behavior and protocol elements of 6LoWPAN ND to simplify the registration flow for link-local addresses, enable verification for the registration, using a registration ownership verifier (ROVR), and enable registration to an IPv6 ND proxy such as, for example, a routing registrar.

Within an RFC 8505 registration flow, a neighbor solicitation (NS) message nay be utilized that includes an extended address registration option (EARO) that registers the address of the host computing device (e.g., a 6LoWPAN Node (6LN) to a router (e.g., a 6LoWPAN Backbone Router (6BBR). A duplicate address detection (DAD) process may be unicast such that the router checks that the address is unique with a central network registrar (e.g., 6LoWPAN border router (6LBR)). This process may be utilized in the cloud in association with, for example, a locator identification separation protocol (LISP) map server (MS)/map resolver (MR).

In one example, an extension referred to as address protected neighbor discovery (AP-ND) may be used within an LLN to protect an owner of an address against address theft and impersonation attacks. AP-ND is an update or extension to the 6LoWPAN ND protocol defined in RFC 6775 and RFC 8505. A host computing device that supports the extension may compute a cryptographic identifier (crypto-ID) and use it with a registered address. The crypto-ID identifies the owner of the registered address and may be used to provide proof of ownership of the registered addresses. Once an address is registered with the crypto-ID and a proof-of-ownership is provided, the owner of that address may modify the registration information, thereby enforcing source address validation. The cryptographic method including its algorithms, curves, encodings, etc., may be signaled by a crypto-type. The parameters of the cryptographic method including at least one of a public or private key of a public key infrastructure (PM) key pair may be passed via a network crypto-identification parameters option (CIPO) defining the cryptographic identifier (crypto-ID), the crypto-ID being derived from the public key of the PM key pair. Further, under AP-ND, at least two separate nonces may be passed between a host computing device and a router; the router passing a first nonce and the host computing device passing a second nonce in response. The present systems and methods utilize a crypto-ID identifying the network 100 to which the host computing device 102 seeks to join. This network crypto-ID may be provisioned or pre-provisioned by a network registrar 106 to the host computing device 102 for the purpose of authenticating to the host computing device 102 that the network 100 is the network the host computing device 102 is intending to join. The network crypto-ID may be a hash of a public key that authenticates the network to which the host computing device seeks to join. The associated private key is used by a network registrar to sign the CIPO via a neighbor discovery protocol signature option (NDPSO).

In AP-ND, a neighbor discovery protocol signature option (NDPSO) may be passed from the host computing device to the router. The NDPSO carries the signature that proves the address ownership (e.g., the crypto-ID passed by the host computing device). The crypto-ID may be derived from the public key and a modifier in a format that includes a hash function used internally by the signature scheme indicated by the crypto-type that is applied to the CIPO and leftmost bits of the resulting hash, up to the desired size, that are used as the crypto-ID.

AP-ND adds a validation phase to the methods and protocols described in RFC 8505 whereby the router checks that the host computing device is the owner of the crypto-ID that is associated with the address in a first registration instance, and allows the use of the address to source packets or inject routes. AP-ND protects the address of the host. However, AP-ND does not provide a guarantee that the host computing device has joined an intended (e.g., the right network). Given that computer networking is ubiquitous including virtual networking and overlay networking, it may prove easy to connect to an incorrect network or communicatively connect two computing devices together. Thus, the systems and methods described herein provide an additional service to a host computing device that confirms to the host computing device that it has joined the intended network.

Examples described herein provide a method including sending, to a network registrar, an extended duplicate address request (EDAR) message including a host nonce (e.g., NonceH) generated by a host computing device, and receiving, from the network registrar, an extended duplicate address confirmation (EDAC) message including a network nonce (e.g., NonceL) generated by the network registrar, the pair of nonces (e.g., NonceH and NonceL) being signed by the network registrar via a private key of a first public key infrastructure (PM) key pair of the network registrar via a first signature. The method further includes sending a neighbor advertisement (NA) message from a router to the host computing device including at least the second nonce (e.g., NonceL). The second nonce (e.g., NonceL) and the public key of the network registrar verifies the first signature from the network registrar, the verification of the first signature indicating that the router is not impersonating the network.

The NA message from the router and based on the EDAC message from the network registrar includes a network crypto-identification parameters option (CIPO) containing the public key of a first PM key pair, an arbitrary modifier and an indication of the size of a network cryptographic identifier (crypto-ID) to be generated. The network crypto-ID is obtained as a truncated hash of the network CIPO, and, thus, is derived from a public key of the first PM key pair. The method may further include pre-provisioning the host computing device with the network crypto-ID as an identification of the network that the host computing device is to join. The method may further include sending the NA message from the router and based on the EDAC message from the network registrar to the host computing device with the network CIPO. Thus, the method includes sending to the host computing device material to validate that the public key corresponds to the network crypto-ID, and that the first signature corresponds with the private key that forms the first PM key pair with the public key. The first signature signs the network crypto-ID via a neighbor discovery protocol signature option (NDPSO).

Preliminary to the above processes, the host computing device may communicate with the router to allow the router to validate the host computing device. Thus, the method further includes receiving, at the router, a first neighbor solicitation (NS) message from the host computing device, the first NS message including an address of the host computing device, and a public key of a second PM key pair of the host computing device. The method further includes sending, from the router to the host computing device, a neighbor advertisement (NA) message including a challenge to the address of the host computing device, and a third nonce generated by the router, and receiving, at the router, a second NS message from the host computing device including the first nonce, the first nonce being signed by the host computing device via a second signature. The method further includes verifying the host computing device based at least in part on the first nonce and the public key of the host computing device to verify the second signature, the verification of the second signature indicating that the host computing device is authentic.

The address of the host computing device includes at least one of an internet protocol (IP) address of the host computing device, and a media access control address (MAC) address of the host computing device. The first NS message includes an extended address registration option (EARO), the EARO including a registration ownership verifier (ROVR), the ROVR including a host crypto-ID. The host crypto-ID may be a hash of a CIPO generated by the host computing device. The second NS message from the host computing device to the router includes a CIPO including the public key. The host crypto-ID may be included within the host CIPO. The host nonce (e.g., Nonce H) may be included in a nonce option of the EARO. The host CIPO may be signed by an NDPSO. The NDPSO carries the first signature proving ownership of the host crypto-ID.

Examples described herein also provide a non-transitory computer-readable medium storing instructions that, when executed, cause one or more processors to perform operations including sending, to a network registrar, an extended duplicate address request (EDAR) message including a host nonce (e.g., NonceH) generated by a host computing device, and receiving, from the network registrar, an extended duplicate address confirmation (EDAC) message including a network nonce (e.g., NonceL) generated by the network registrar, the pair of nonces (e.g., NonceH and NonceL) being signed by the network registrar via a private key of a first public key infrastructure (PM) key pair of the network registrar via a first signature. Although on nonce is sent in any given message (because each party knows its own nonce), both nonces are used in the signed content of the messages. The operations further include sending a neighbor advertisement (NA) message from a router to the host computing device including at least the second nonce (e.g., NonceL). The second nonce (e.g., NonceL) and the public key of the network registrar verifies the first signature from the network registrar, the verification of the first signature indicating that the router is not impersonating the network.

The NA message from the router and based on the EDAC message from the network registrar includes a network crypto-identification parameters option (CIPO) containing the public key of a first PM key pair, an arbitrary modifier and an indication of the size of a network cryptographic identifier (crypto-ID) to be generated. The network crypto-ID is obtained as a truncated hash of the network CIPO, and, thus, is derived from a public key of the first PM key pair. The method may further include pre-provisioning the host computing device with the network crypto-ID as an identification of the network that the host computing device is to join. The method may further include sending the NA message from the router and based on the EDAC message from the network registrar to the host computing device with the network CIPO thus includes sending to the host computing device material to validate that the public key corresponds to the network crypto-ID, and that the first signature corresponds with the private key that forms the first PM key pair with the public key. The first signature signs the network crypto-ID via a neighbor discovery protocol signature option (NDPSO).

Preliminary to the above operations, the host computing device may communicate with the router to allow the router to validate the host computing device. Thus, the operations further include receiving, at the router, a first neighbor solicitation (NS) message from the host computing device, the first NS message including an address of the host computing device, and a public key of a second PM key pair of the host computing device. The operations further include sending, from the router to the host computing device, a neighbor advertisement (NA) message including a challenge to the address of the host computing device, and a third nonce generated by the router, and receiving, at the router, a second NS message from the host computing device including the first nonce, the first nonce being signed by the host computing device via a second signature. The operations further include verifying the host computing device based at least in part on the first nonce and the public key of the host computing device to verify the second signature, the verification of the second signature indicating that the host computing device is authentic.

The address of the host computing device includes at least one of an internet protocol (IP) address of the host computing device, and a media access control address (MAC) address of the host computing device. The first NS message includes an extended address registration option (EARO), the EARO including a registration ownership verifier (ROVR), the ROVR including a host crypto-ID. The host crypto-ID may be a hash of a CIPO generated by the host computing device. The second NS message from the host computing device to the router includes a CIPO including the host crypto-ID. The host nonce (e.g., Nonce H) may be included in a nonce option of the EARO. The host CIPO may be signed by an NDPSO. The NDPSO carries the first signature proving ownership of the host crypto-ID.

Examples described herein also provide a system including a router, and a network registrar communicatively coupled to the router. The router includes one or more processors, and one or more non-transitory computer-readable media storing instructions that, when executed by the one or more processors, cause the one or more processors to perform operations including sending, to a network registrar, an extended duplicate address request (EDAR) message including a host nonce (e.g., NonceH) generated by a host computing device, and receiving, from the network registrar, an extended duplicate address confirmation (EDAC) message including a network nonce (e.g., NonceL) generated by the network registrar, the pair of nonces (e.g., NonceH and NonceL) being signed by the network registrar via a private key of a first public key infrastructure (PM) key pair of the network registrar via a first signature. The operations further include sending a neighbor advertisement (NA) message from a router to the host computing device including at least the second nonce (e.g., NonceL). The second nonce (e.g., NonceL) and the public key of the network registrar verifies the first signature from the network registrar, the verification of the first signature indicating that the router is not impersonating the network.

Preliminary to the above operations, the host computing device may communicate with the router to allow the router to validate the host computing device. Thus, the operations further include operations further include receiving, at the router, a first neighbor solicitation (NS) message from the host computing device, the first NS message including an address of the host computing device, and a public key of a second PKI key pair of the host computing device. The operations further include sending, from the router to the host computing device, a neighbor advertisement (NA) message including a challenge to the address of the host computing device, and a third nonce generated by the router, and receiving, at the router, a second NS message from the host computing device including the first nonce, the first nonce being signed by the host computing device via a second signature. The operations further include verifying the host computing device based at least in part on the first nonce and the public key of the host computing device to verify the second signature, the verification of the second signature indicating that the host computing device is authentic.

The NA message from the router and based on the EDAC message from the network registrar includes a network crypto-identification parameters option (CIPO) containing the public key of a first PM key pair, an arbitrary modifier and an indication of the size of a network cryptographic identifier (crypto-ID) to be generated. The network crypto-ID is obtained as a truncated hash of the network CIPO, and, thus, is derived from a public key of the first PM key pair. The method may further include pre-provisioning the host computing device with the network crypto-ID as an identification of the network that the host computing device is to join. The method may further include sending the NA message from the router and based on the EDAC message from the network registrar to the host computing device with the network CIPO thus includes sending to the host computing device material to validate that the public key corresponds to the network crypto-ID, and that the first signature corresponds with the private key that forms the first PM key pair with the public key. The first signature signs the network crypto-ID via a neighbor discovery protocol signature option (NDPSO).

Additionally, the techniques described in this disclosure may be performed as a method and/or by a system having non-transitory computer-readable media storing computer-executable instructions that, when executed by one or more processors, performs the techniques described above.

Example Embodiments

FIG. 1 schematically illustrates a system-architecture diagram of network 100 for host and network verification, according to an example of the principles described herein. The network 100 may include a number of router(s) 104 communicatively coupled to a number of server(s) 108. The router 104 may include any type of computing device capable of transmitting data between computing devices within the network 100 and/or capable of transmitting data between networks. The router 104 may include a leaf router within a cloud network, an edge router, and an access point router, among other types of routers within a myriad of different types of networks.

A number of network registrar(s) 106 may be included within the network 100. The network registrar 106 maintains a list of addresses in order to establish connectivity for the host computing device 102 to the network 100. The network registrar 106 may include any computing device that can process a registration in either NS(EARO) or EDAR messages and consequently respond with an NA or EDAC message containing the EARO and appropriate status for the registration. Thus, the network registrar 106 supports EDAR and EDAC messages. The router 104, network registrar 106, server(s) 108 may be capable of utilizing and operating under the IPv6 communications protocol to provide identification and location data for computing devices within the network and to router traffic within the network.

The network 100 may include a cloud network 110 as depicted in FIG. 1. Further, the network 100 may include a low-power and lossy network (LLN), an Internet of Things (IoT) network, a routing protocol for low-power and lossy (RPL) network, an overlay network, other types and forms of network and aspects thereof.

The host computing device 102 may be a workstation, a desktop computer, a laptop, a tablet, a network appliance, an e-reader, a smartphone, a server, a switch, a router, a hub, a bridge, a gateway, a modem, a repeater, an access point, a virtual machine, or other computing devices and virtual (e.g., emulated) machines seeking insertion into the network 100 and requesting routing services. In the examples described herein, the host computing device may be a 6LoWPAN-enabled computing device capable of transmitting neighbor solicitation (NS) messages. The NS messages may include an extended address registration option (EARO) that registers the address of the host computing device 102 to the router 104 using a registration ownership verifier (ROVR) included within the EARO in order to carry different types of information, such as, for example, cryptographic information of variable size (e.g., a crypto-ID). Further, the NS messages may include a crypto-identification parameters option (CIPO) defining the cryptographic identifier (crypto-ID), the crypto-ID being derived from a public key of a PM key pair. The CIPO contains the parameters that are necessary for the proof. The EARO further includes a nonce option, and a neighbor discovery protocol signature option (NDPSO). Still further, the NS messages may include a nonce option and a neighborhood discovery protocol signature option (NDPSO).

In the examples described herein where a CIPO is employed (e.g., at 206 and 210), the CIPO carries the parameters used to form a crypto-ID (e.g., the host crypto-ID generated by the host computing device 102, and the network crypto-ID generated by the network registrar 106). Further, the NDPSO, as described herein at, for example, 206 and 210 (NDPSO and network NDPSO, respectively) carries the signature that proves the ownership of the respective crypto-ID. The NDPSO does not include a key hash field, but, instead, the leftmost 128 bits of the ROVR field in the EARO at 202 are used as hash to retrieve the CIPO that contains the key material used for signature verification, and may be left-padded if necessary.

The router 104 may include any routing device including an edge router, an internal router, a border router, a backbone router, or other routing device that may assist in verifying the host computing device 102 and verifying for the host computing device 102 that the network 100 is the intended network the host computing device 102 seeks to. In the examples described herein, the router 104 may be a 6LoW-PAN router (6LR), a 6LoWPAN border router (6LBR), a 6LoWPAN backbone router (6BBR), or other 6LoWPAN-enabled routing devices capable of transmitting neighbor advertisement (NA) messages. The NA messages may include an EARO challenge. The host computing device 102, as a registering node, is challenged for owning a registered address or for being an acceptable proxy for the registration. The router 104 challenges the crypto-ID sent by the host computing device 102 in an NS message. The host computing device 102 places a cryptographic token, the host crypto-ID, in the ROVR that is associated with the address at the first registration, enabling the router 104 to later challenge the host crypto-ID to verify that the host computing device 102 is the original registering node. The ROVR field within the EARO provides proof of ownership of an IP address via the inclusion of the host crypto-ID. The host crypto-ID is derived from a public key of a key pair generated by the host computing device 102 at the time the host computing device 102 boots up or otherwise before access to the network is requested. The host computing device 102 retains the private key of the key pair. The host computing device 102 also generates an IP address independent from the crypto-ID. The IP address generated by the host computing device 102 is an IP address that does not exist within the network 100.

The router 104 challenges the host computing device 102 when the ROVR is received in the EARO from the host computing device 102 and when a new registration attempts to change a parameter that identifies the host computing device 102, for example the IP address, and/or the MAC address of the host computing device. This verification protects against a rogue routing device that would steal an address and attract the traffic of the host computing device 102 or use the address as a source address. Further, the router 104 also challenges the host computing device 102 if the network registrar 106 directly signals to do so, using an extended duplicate address confirmation (EDAC) message with a "validation requested" status. An extended duplicate address request (EDAR) message may be echoed by the router 104 in the NA (EARO) back to the host computing device 102 (e.g., the registering node).

The network registrar 106 may include any computing device including a router, a border router, a controller, a processing device, or other device capable of receiving the EDAR message from the router 104, send the EDAC message to the router 104, and participate in the validation of the intended network to which the host computing device 102 is to be joined. In one example, the network register 106 may include a 6LoWPAN border router (6LBR) or a locator identification separation protocol (LISP) map server/map resolver (MS/MR).

Once joined as part of the network 100, the host computing device 102 may communicate with a server 108 or other computing device to utilize services provided by the server 108. The server 108 may provide a myriad of different types of computing resources including, for example, data storage services, mail services, printing services, web services, gaming services, and application services.

Figure 2:
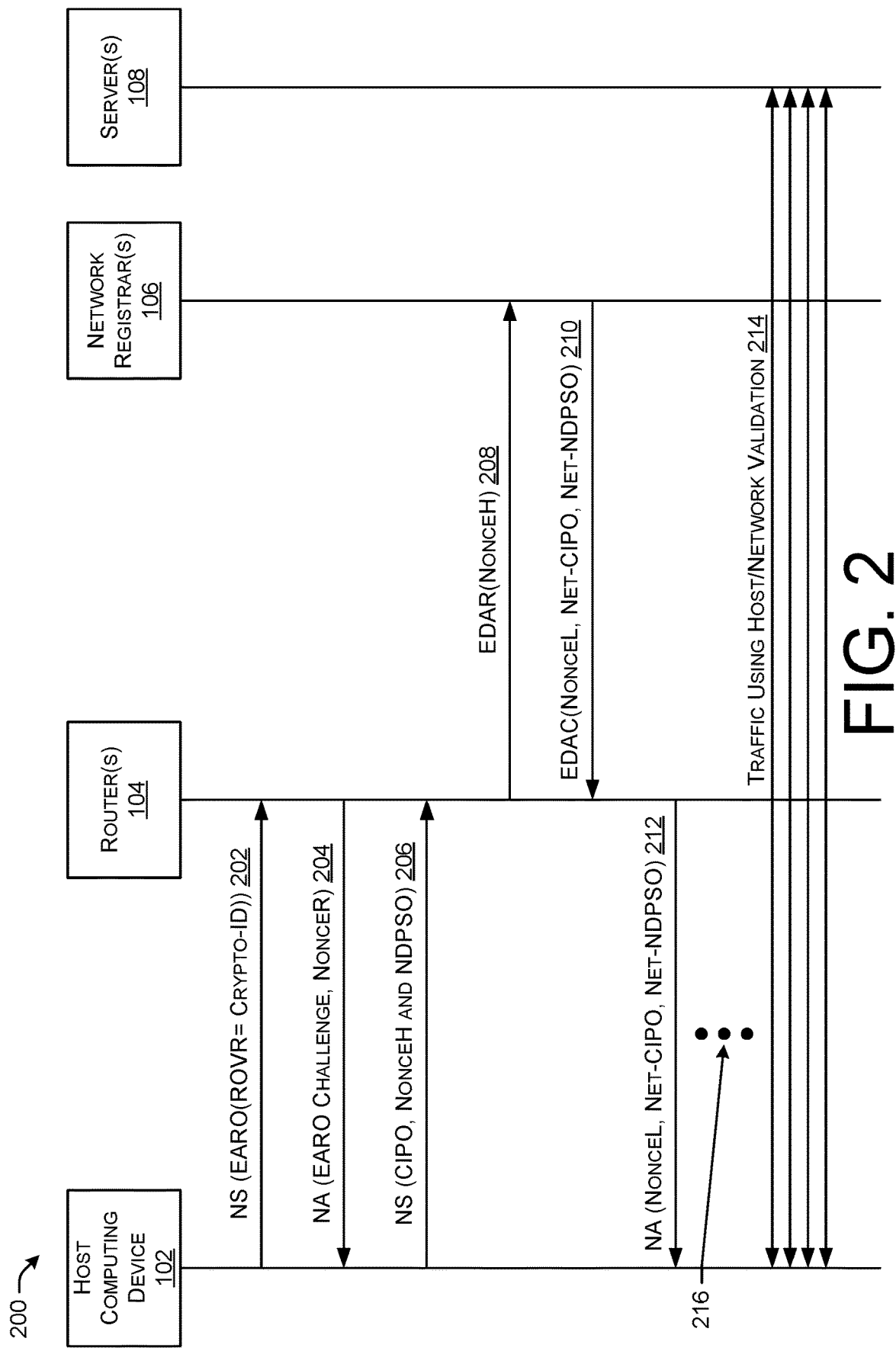
FIG. 2 schematically illustrates example call flows for verification of a host to a network and the network to the host, according to an example of the principles described herein.

The manner in which the host computing device 102 joins the network 100 will now be described in connection with FIG. 2. FIG. 2 schematically illustrates example call flows 200 for verification of a host computing device 102 to a network 100 and the network 100 to the host computing device 102, according to an example of the principles described herein. As a summary of the call flows 200 depicted in FIG. 2, the host computing device 102 and the network registrar 106 generate their own respective crypto-identification parameters option (CIPO) messages (e.g., a host CIPO and network CIPO, respectively) which contain their respective public keys, and a crypto-ID that is a hash of that CIPO. By some means, a network crypto-ID is provisioned in the host computing device 102. The call flow 200 includes the host computing device 102 advertising its address as target in a first neighbor solicitation (NS) message at 202. The first NS message indicates a registration ownership verifier (ROVR) that contains a host crypto-ID, which is a provable identity. The router 104, at 204, sends back a challenge in a first neighbor advertisement (NA) message in response to the first NS message. The challenge is indicated by a status and a nonce (e.g., NonceR) generated by the router 104. In response to the challenge presented in the NA message from the router 104, the host computing device 102, at 206, provides proof in response to the challenge via a second NS message containing its nonce (e.g., NonceH), a CIPO, and a neighbor discovery protocol signature option (NDPSO) that match the host crypto-ID. At that point (e.g., at 206), the router 106 validates the host computing device 102, but the host computing device 102 has not yet validated the network 100.

In order to begin the process of validating the network 100 as to the host computing device 102, the router 104 sends an extended duplicate address request (EDAR) message to the network registrar 106 similar to an AP-ND process, with the host nonce (e.g., NonceH) being passed to the network registrar 106 at 208. The network registrar 106 generates a nonce (e.g., NonceL), and generates an extended duplicate address confirmation (EDAC) message at 210 in response to the EDAR message from the router 104. The network registrar 106 generates a signature within the EDAC that contains the host nonce (e.g., NonceH) and the network registrar nonce (e.g., NonceL). The network registrar 106 also generates a network CIPO (e.g. Net-CIPO). The network registrar 106 signs the network CIPO via a network NDPSO (e.g., Net-NDPSO). The network registrar 106 sends the EDAC message to the router 104 at 210 as similarly performed in an AP-ND process, but with the network registrar nonce (e.g., NonceL), the network CIPO (e.g., Net-CIPO), and the network NDPSO (e.g., Net-NDPSO) as added by the network registrar 106. The router 104 replies to the second NS message sent by the host computing device 102 at 206 with a second NA message as similarly performed in AP-ND processing, but with the network registrar nonce (e.g., NonceL), the network CIPO (e.g., Net-CIPO), and the network NDPSO (e.g., Net-NDPSO) as added by the router 106 based on the EDAC message received from the network registrar 106 at 210. The host computing device validates the network 100 based on the validation of the network crypto-ID (e.g., Net-Crypto-ID). Having summarized the call flow 200 of FIG. 2, details for each of the individual call flows will now be described.

As depicted in FIG. 2, the host computing device 102 may send a first NS message to the router 104, and the router 104 receives the first NS message from the host computing device 102 at 202. The first NS message includes an address of the host computing device 102 and a public key of a first PM key pair of the host computing device 102. More specifically, the first NS message includes an extended address registration option (EARO) message. The EARO message includes a registration ownership verifier (ROVR) including a crypto-ID of the host computing device 102.

The host crypto-ID identifies the host and is a hash of the host CIPO included in the EARO message. The address of the host computing device 102 may include at least one of an internet protocol (IP) address and/or a media access control address (MAC) address of the host computing device 102. As described herein, a host computing device 102 supporting the AP-ND extension computes a cryptographic identifier (crypto-ID) and uses it with one or more of their registered addresses (e.g., the IP address, and/or the MAC address). The crypto-ID identifies may be used to provide proof of ownership of the registered address. Once an address is registered with the crypto-ID and a proof-of-ownership is provided or established, only the owner of that address can modify the registration information, thereby enforcing source address validation. The host computing device 102 (acting as a 6LN) generates the host crypto-ID and places it in the ROVR field of the EARO of the NS message at 202 during the registration of one or more of its addresses with the router 104 (acting as a 6LR). Proof of ownership of the crypto-ID is passed with the first registration exchange such as a first NS message to the new router 104 and enforced at the router 104. The router validates ownership of the crypto-ID before it creates any new registration state or changes existing information.

The crypto-ID is derived from a public key and a modifier as follows. The hash function used internally by the signature scheme indicated by a crypto-type is applied to a CIPO. In one example, all the reserved and padding bits are set to zero. The leftmost bits of the resulting hash, up to the desired size, are used as the crypto-ID. In one example, a minimal size for the crypto-ID of 128 bits is used unless backward compatibility is needed.

A first neighbor advertisement (NA) message is generated by and sent from the router 104 to the host computing device 102 in response to the first NS message at 204. The challenge is indicated by the EARO including a status and a nonce (e.g., NonceR) generated by the router 104. The status included in the EARO may be, for example, "validation requested." The NA message thus includes an EARO challenge to the address of the host computing device 102, and a first nonce (e.g., NonceR) generated by the router 104. Further, the challenge to the address of the host computing device 102 includes a nonce option. The nonce option contains a nonce value (e.g., "NonceR") that, to the extent possible for the implementation, was never employed in association with the key pair used to generate the crypto-ID. A cryptographic nonce is an arbitrary number that can be used just once in a cryptographic communication. A nonce may be a random or pseudo-random number issued in an authentication protocol to ensure that old communications cannot be reused in replay attacks. Thus, the host computing device 102, the router 104, and/or the network registrar 106 may generate their respective nonces for authentication or validation purposes described herein.

The host computing device 102 receives the NA message including the EARO challenge, and in response to the NA message, the host computing device 102 generates and sends to the router 104 a second NS message at 206. The second NS message includes a second nonce (e.g., "NonceH") generated by the host computing device 102. The host computing device 102 provides proof in response to the challenge via a second NS message containing its nonce (e.g., NonceH), a CIPO, and a neighbor discovery protocol signature option (NDPSO) that match the host crypto-ID. The second nonce (e.g., NonceH) is included in the second NS message at 206, and the nonce pair including the first nonce (e.g., NonceR) and the second nonce (e.g., NonceH) is signed by the host computing device 102 via a signature. The signature generated by the host computing device 102 provides proof-of-ownership of the private-key of the host computing device 102 and is carried in a host neighbor discovery protocol signature option (NDPSO). In the examples described herein including at 206 and 210, though only one nonce (e.g., NonceH or NonceL, respectively) is transmitted in the messages since each party knows its own nonce, both nonces are used in the signed content. Thus, at 206, both the nonce (e.g., NonceR) from the router 104 and the nonce (e.g., NonceH) from the host computing device 102 are used to sign the NS message via, for example, the CIPO and the NDPSO that match the host crypto-ID.

In one example, the host NDPSO is generated by the host computing device 102 by concatenating byte-strings in the following order: (1) a 128-bit message type tag (in network byte order); (2) the CIPO; (3) a 16-byte target address (in network byte order) sent in the first NS message (e.g., the address which the host computing device 102 is registering with the router 102 and the network registrar 106); (4) the NonceR received from the router 104 (in network byte order) in the NA message (the nonce may be at least 6 bytes long); (5) the NonceH sent from the host computing device 102 in network byte order (the nonce may be at least 6 bytes long); and (6) 1-byte option length of the EARO containing the host crypto-ID. The signature algorithm specified by the crypto-type is applied using the private key.

The router 104, upon receiving the NDPSO and CIPO options may validate the host computing device 102. In one example, the router 104 checks that the EARO length in the CIPO matches the length of the EARO. If so, it regenerates the host crypto-ID based on the CIPO to make sure that the leftmost bits up to the size of the ROVR match. The router 104 attempts to verify the signature in the NDPSO option based at least in part on the check being successful. In one example, the check may be processed by forming the message to be verified, by concatenating the following byte-strings in the order listed: (1) the 128-bit message type tag (in network byte order); (2) the CIPO; (3) the 16-byte target address (in network byte order) received in the first NS) message (the target address is the address which the host computing device 102 is registering with the router 104 and the network registrar 106); (4) the NonceR sent in the NA message from the router 104 (the NonceR may be at least 6 bytes long); (5) NonceH received from the host computing device 102 (in network byte order) in the second NS message (the nonce is at least 6 bytes long); and (6) 1-byte EARO length received in the CIPO. The router 104 verifies the signature on the second NS message with the public key in the CIPO and the locally computed values using the signature algorithm specified by the crypto-type.

The router 104 propagates the information to the network registrar 106 based at least in part on the verification succeeding, using an EDAR/EDAC flow as describe below in connection with call flows 208, 210, and 212. In one example, due to the first-come/first-serve nature of the registration, if the address is not registered to the network registrar 106, then flow succeeds and both the router 104 and network registrar 106 add the state information about the host crypto-ID and target address of the host computing device 102 being registered to their respective databases. In this manner, the host computing device 102 is verified by the router 104 based at least in part on the second NS message. The verification of the second signature indicates that the host is authentic.

The first NS message at 202 includes an extended address registration option (EARO). The EARO includes the registration ownership verifier (ROVR). The ROVR may be derived from the MAC address of the host computing device 102 (e.g., using the 64-bit Extended Unique Identifier EUI-64 address format specified by IEEE). However, the EUI-64 can be spoofed, and therefore, any node connected to the subnet and aware of a registered-address-to-ROVR mapping could effectively fake the ROVR. This would allow an attacker to steal the address and redirect traffic for that address. In the systems and methods described herein, the host computing device 102 generates the host crypto-ID and places the host crypto-ID in the ROVR field during the registration of one (or more) of its addresses with the router 104. Proof of ownership of the host crypto-ID is passed with the first registration exchange at, for example, 202, to the router 104, and enforced at the router 104. The router 104 validates ownership of the host crypto-ID before it creates any new registration state or changes existing information.

The ROVR includes the host crypto-ID. Further, the router 104 stores the host crypto-ID, one or more addresses of the host computing device 102, and any public and/or private key of a first PM key pair of the host computing device 102 as router registration data (FIG. 4, 414) of a data store (FIG. 4, 408) in order to allow for the host computing device 102 to be recognized in any subsequent registration to the network 100.

The second NS message at 206 from the host computing device 102 includes a CIPO including the network crypto-ID, the nonce (e.g., NonceH), and the NDPSO. The NDPSO verifies the host computing device 102 has ownership of the network crypto-ID to the router 104. Having described the manner in which the router 104 verifies the host computing device 102, the manner in which the host computing device 102 validates the network 100 (e.g., how the host computing device 102 verifies that the network 100 is the network the host computing device 102 intends to join) will now be described in connection with call flows 208 through 212.

Thus, as depicted in FIG. 2, the router 104 sends, to the network registrar 108, an extended duplicate address request (EDAR) message at 208. Specifically, the router 104 sends the EDAR message to the network registrar 106 similar to an AP-ND process, but with the host nonce (e.g., NonceH) being passed to the network registrar 106. The router 104 and the network registrar 106 may communicate using ICMPv6 Extended Duplicate Address Request (EDAR) and Extended Duplicate Address Confirmation (EDAC) messages. In the examples described herein, the EDAR and EDAC messages are extended to carry a cryptographically generated ROVR. The assumption is that the router 104 and the network registrar 106 maintain a security association to authenticate and protect the integrity of the EDAR and EDAC messages, so there is no need to propagate the proof of ownership to the network registrar 106. The network registrar 106 implicitly trusts that the router 104 performs the verification when the network registrar 106 requires it, and if there is no further exchange from the router 104 to remove the state, that the verification succeeded.

The EDAR message includes the nonce (e.g., NonceH) generated and provided by the host computing device 102. The network registrar 106, within the network 100, is the central repository of all the registered addresses in its domain. Further, the network registrar 106 maintains a registration state for all devices in its attached network 100. Together with the router 104, the network registrar 106 assures uniqueness and grants ownership of an IPv6 address before it can be used in the network 100. In one example, the network links between the router 104 and the network registrar 106 are protected so that a packet that was validated by the router 104 may be safely routed by other on-path routers to the network registrar 106.

Thus, in order to begin the process of validating the network 100 as to the host computing device 102, the router 104 sends the EDAR message to the network registrar 106 at 208 similar to an AP-ND process, with the host nonce (e.g., NonceH) being passed to the network registrar 106. The network registrar 106 receives the EDAR at 208 and stores data relating to the host crypto-ID of the host computing device 102, one or more addresses of the host computing device 102, and any public and/or private key of a first PM key pair of the host computing device 102 as network registration data (FIG. 5, 514) of a data store 508 in order to allow for the host computing device 102 to be recognized in any subsequent registration to the network 100.

At 210, the router 104 receives, from the network registrar 106, an extended duplicate address confirmation (EDAC) message including a third nonce (e.g., "NonceL"). The EDAC message is signed by the network registrar 106 via a private key of a second public key infrastructure (PKI) key pair of the network registrar 106 via a second signature. The second signature may be generated by the network registrar 106 to provide proof-of-ownership of the private-key and may be carried in the network NDPSO (e.g., Net-NDPSO).

The network NDPSO is generated by the network registrar 106. The network registrar 106 generates the nonce (e.g., NonceL), and generates the EDAC message at 210 in response to the EDAR message from the router 104. The network registrar 106 generates a signature within the EDAC that contains the host nonce (e.g., NonceH) and the network registrar nonce (e.g., NonceL). Like at 206 in connection with the nonce pair including the first nonce (e.g., NonceR) and the second nonce (e.g., NonceH), the nonce pair including the second nonce (e.g., NonceH) and the third nonce (e.g., NonceL) is signed by the network registrar via a signature. The network registrar 106 also generates a network CIPO (e.g. Net-CIPO). The network registrar 106 signs the network CIPO via a network NDPSO (e.g., Net-NDPSO). In one example, the value used in the signature may have a size that is equal to the size of a network token, placed in the network CIPO by the network registrar 106 before signature and based on its prior knowledge of it, as opposed to an option length of an EARO such as the EARO sent at 204 by the router 104. The network registrar 106 sends the EDAC message to the router 104 at 210 as similarly performed in an AP-ND process, but with the network registrar nonce (e.g., NonceL), the network CIPO (e.g., Net-CIPO), and the network NDPSO (e.g., Net-NDPSO) as added by the network registrar 106.

In the above examples, the network crypto ID is not passed on in the EARO and/or the EDAR due to the assumption that there is only one network crypto-ID and both the host computing device 102 and the network registrar 106 know and have stored the network crypto-ID in memory. Thus, although the network crypto-ID is not included in the above examples such as in the EARO at 202 or the EDAR at 208, in one example, the value of including a network crypto-ID in the EARO at 202 or the EDAR at 208 may allow the network 100 to have multiple crypto IDs. Thus, the network crypto-ID, in this example, may be added to the NS message at 202 and the EDAR message at 208 as a message option. In this example, a same public address may be used to generate different tokens by changing a modifier in the CIPO or by changing the length that impacts the NDPSO generation and verification as described above. With this, a plurality of network crypto tokens may be generated. Those network crypto tokens may be associated in groups, to which access rights may be assigned. Provisioning different crypto-IDs to different host computing devices may allow the grouping of the crypto-IDs. In this example, the network registrar 106 may match a respective network crypto-ID with one of possibly multiple CIPOs generated by the network registrar 106. The matched CIPO may contain the length of the crypto token (in a length field of the EARO) and the modifier so that any changes in those values means a different CIPO including a different token since the CIPO carries the parameters used to form a crypto-ID. Further, the length of the network crypto-ID passed by the host computing device 102 may be the value used in the NDPSO generation and verification. Thus, multiple net crypto-IDs may be enabled for the same network where different modifiers and/or different keys with different security levels may be employed such as in connection with IoT devices. The host computing device 102 is provisioned with one of the crypto-IDs, and that crypto-ID is passed through the NS message at 202 and the EDAR at 208 to the network registrar 106. The network registrar 106 chooses the CIPO that matches. Thus, this example utilizes the modifier field in the CIPO above as a group ID or an indicator of the group of the user.

Turning again to the example of FIG. 2, the network CIPO defines the network crypto-ID. The network crypto-ID is derived from a public key (e.g., a network public key) of the PM key pair provided by the network registrar 106. In one example, one network registrar 106 may be responsible for the network 100 and the router(s) 104 have a secured channel to talk to the network registrar 106.

The router 104 sends an extended duplicate address request (EDAR) message to the network registrar 106 similar to an AP-ND process, with the host nonce (e.g., NonceH) being passed to the network registrar 106 at 208. The network registrar 106 generates a nonce (e.g., NonceL), and generates an extended duplicate address confirmation (EDAC) message at 210 in response to the EDAR message from the router 104. As noted above, the network registrar 106 generates a signature within the EDAC that signs the host nonce (e.g., NonceH) and the network registrar nonce (e.g., NonceL) as a nonce pair. Further, the network registrar 106 generates a network CIPO (e.g. Net-CIPO). The network registrar 106 signs these items via a network NDPSO (e.g., Net-NDPSO). The NDPSO signs the pair of nonces (e.g., NonceH and NonceL).

The network registrar 106 sends the EDAC message to the router 104 at 210 as similarly performed in an AP-ND process, but with the network registrar nonce (e.g., NonceL), the network CIPO (e.g., Net-CIPO), and the network NDPSO (e.g., Net-NDPSO) as added by the network registrar 106. The exchange of the EDAR message at 208 and the EDAC message at 210 between the router 104 and the network registrar 106 ensures that an address is unique across the domain covered by the network registrar 106. As to the EDAC message at 210, the second nonce (e.g., NonceH), the third nonce (e.g., NonceL), and the private key of the network registrar 106 verifies the first signature from the network registrar 106, the verification of the first signature indicating that the router 104 is not impersonating the network 100 and is not a rogue router. The pair of nonces (e.g., the second nonce (e.g., NonceH) and the third nonce NonceL) is different from the nonces in the AP-ND flow (call flows 202, 204, and 206) since the nonce in the challenge by the router 104 at 204 is coming from the router 104 and is independent from the network registrar 106.

The EDAC message at 210 includes the network crypto-identification parameters option (CIPO) defining the network crypto-ID. The network crypto-ID is derived from the public key of the PM key pair. Further, as mentioned above, the host computing device 102 is pre-provisioned with the network crypto-ID as an identification of the network that the host is to join.

As described above, the network crypto-ID may be included in the EARO at 202 and/or the EDAR at 208, and the network 100 may use multiple network crypto-IDs for the same network where different modifiers and/or different keys with different security levels are employed. The network crypto tokens in this example may be associated in groups, to which access rights and other security privileges may be assigned or granted. In one example, this may be used to signal the service that the network 100 will provide to the host computing device 102. In this example, the router 104 may check the signature within the EDAC message at 210 received from the network registrar 106 as a confirmation that a service and/or security privileges may be granted to the host computing device 102. Further, the modifier that signals the service level that this host computing device 102 may receive may be found in the CIPO of the EDAC message. The router 104 may enforce that service, or tag the packet sent at 212 to the host computing device 102 with an identifier that signals to the rest of the network 100 what service level the host computing device 102 is granted. In one example, this may be performed via the Identity Services Engine (ISE) developed by Cisco Systems, Inc. ISE enables a dynamic and automated approach to policy enforcement that simplifies the delivery of highly secure network access control and empowers software-defined access and automates network segmentation. The router 104 may also enforce the services and/or security privileges granted to the host computing device 102 based on the service and/or security privileges identified by the network crypto-ID and its assigned security level.

At 212, a second NA message is sent to the host computing device 102. Sending the second NA message to the host computing device 102 includes sending to the host computing device 102 the public key to validate that the public key corresponds to the network crypto-ID, and that the second signature corresponds with the private key that forms the PM key pair with the public key. The first signature at 206 and the second signature at 210 sign their respective CIPOs (e.g., CIPO at 206 and Net-CIPO at 210) via a neighbor discovery protocol signature option (NDPSO) (e.g., the NDPSO at 206 and Net-NDPSO at 210). In this manner, the router 104 replies to the second NS message sent by the host computing device 102 at 206 with a second NA message as similarly performed in AP-ND processing, but with the network registrar nonce (e.g., NonceL), the network CIPO (e.g., Net-CIPO), and the network NDPSO (e.g., Net-NDPSO) as added by the router 106 based on the EDAC message received from the network registrar 106 at 210. The host computing device validates the network 100 based on the validation of the network crypto-ID (e.g., Net-Crypto-ID).

Following the validation of the host computing device 102 as to the router 104 and network registrar 106 and validating the network 100 as to the host computing device 102, the host computing device 102 may then freely communicate with other computing devices within the network 100 including, for example a number of servers 108. The server(s) 108 may provide a myriad of different types of computing resources to or for the host computing device 102 including, for example, data storage services, mail services, printing services, web services, gaming services, and application services. In one example, at 216, a number of routes may be injected to the host computing device 102 such as, for example, with a routing protocol for low power and lossy networks (RPL) destination advertisement object (DAO) message.

The systems and methods described herein ensure that the host computing device 102 joins an expected network. Further, the systems and methods described herein enables a host computing device 102 to ensure that it has joined an appropriate network 100 using the same flow that the network 100 ensures to trust the host computing device 102. This technique protects the host computing device 102 from joining an incorrect network 100 due to a rogue router.

Further, the systems and methods described herein extend the method that the host computing device 102, the router 104, and the network registrar 106 use to prove that the host computing device 102 is the owner of an address and to prove to the host computing device that it has joined the right network. Thus, the systems and methods described herein may be easily added to an IPv6 stack and provides an additional zero-trust guarantee. The call flow may be reversed while reusing the host computing device 102 nonce in a fashion that proves the network 100 to be the expected or intended network with minimal addition to the processing and network infrastructure. In other words, the present systems and methods allow the router 104 to validate the host computing device 102 as well as allow the host computing device 102 to validate the network 100 to which the host computing device 102 seeks to join. Having described the topology of the network 100 and the call flows within the network 100, the host computing device 102, the router 104, and the network registrar 106 and their respective elements will now be described.

Figure 3:
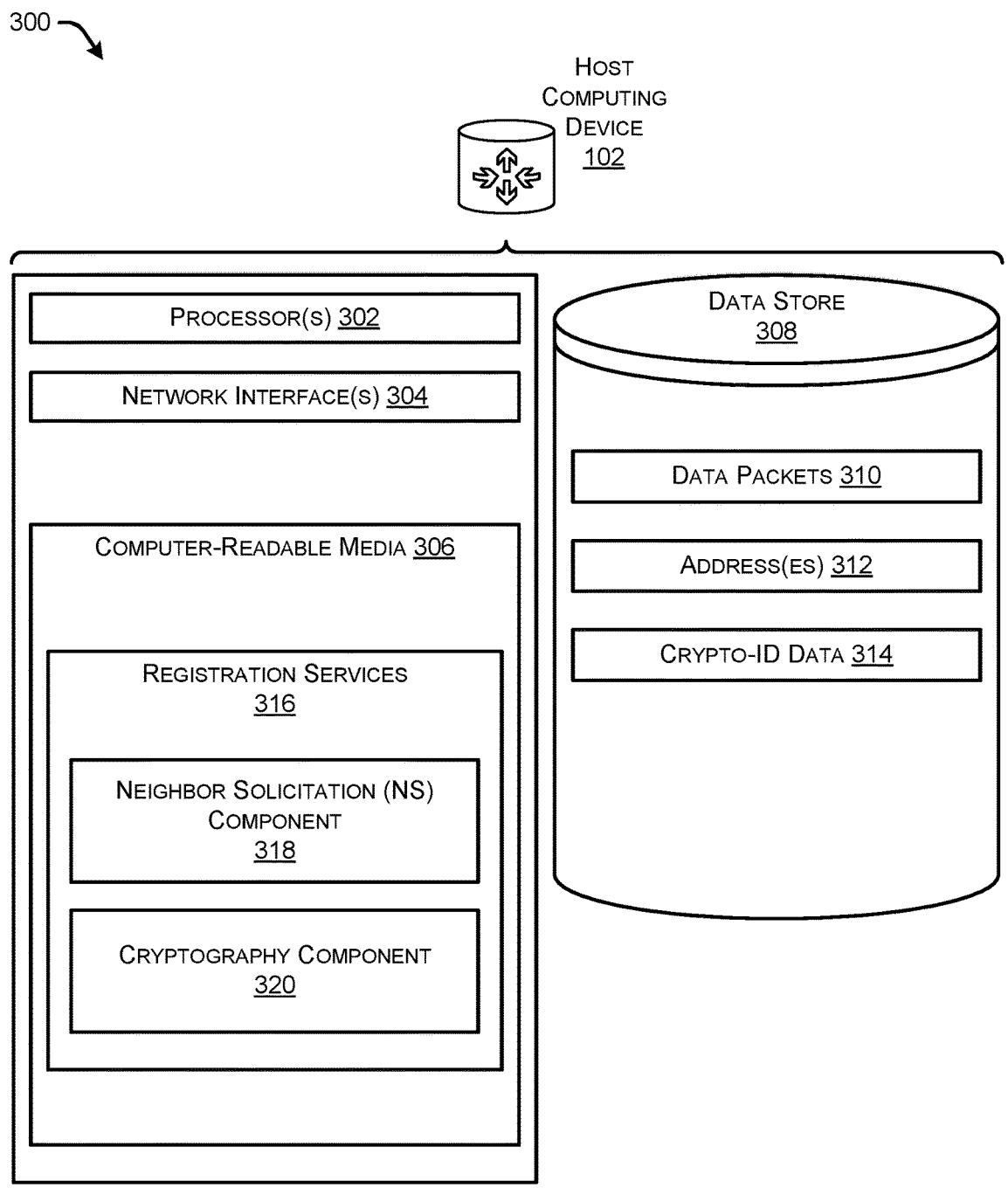
FIG. 3 is a component diagram of example components of a host computing device within the network of FIG. 1, according to an example of the principles described herein.

FIG. 3 is a component diagram 300 of example components of a host computing device 102 within the network of FIG. 1, according to an example of the principles described herein. As illustrated, the host computing device 102 may include one or more hardware processor(s) 302 configured to execute one or more stored instructions. The processor(s) 302 may comprise one or more cores. Further, the host computing device 102 may include one or more network interfaces 304 configured to provide communications between the host computing device 102 and other devices, such as the router 104, the network registrar 106, and/or the server(s) 108. The network interface(s) 304 may include devices configured to couple to personal area networks (PANs), wired and wireless local area networks (LANs), wired and wireless wide area networks (WANs), and so forth. For example, the network interfaces 304 may include devices compatible with the wired and/or wireless communication technologies and protocols described herein.

The host computing device 102 may also include computer-readable media 306 that stores various executable components (e.g., software-based components, firmware-based components, etc.). In addition to various components discussed herein, the computer-readable media 306 may further store components to implement functionality described herein. While not illustrated, the computer-readable media 306 may store one or more operating systems utilized to control the operation of the one or more devices that comprise the host computing device 102. According to one example, the operating system comprises the LINUX operating system. According to another example, the operating system(s) comprise the WINDOWS SERVER operating system from MICROSOFT Corporation of Redmond, Wash. According to further examples, the operating system(s) may comprise the UNIX operating system or one of its variants. It may be appreciated that other operating systems may also be utilized.

Additionally, the host computing device 102 may include a data store 308 which may comprise one, or multiple, repositories or other storage locations for persistently storing and managing collections of data such as databases, simple files, binary, and/or any other data. The data store 308 may include one or more storage locations that may be managed by one or more database management systems. The data store 308 may store, for example, data packets 310 for transmission to the router 104, the network registrar 106, and/or the server(s) 108, among other networked computing devices. The data packets 310 may include data sent via the host computing device 102 in a data session and within a data flow as described herein.

Further, the data store 308 may store a number of address(es) 312. The address(es) 312 may include any data defining an address of the host computing device 102 that may be used to validate the host computing device 102 to the router 104 and the network 100 as described herein.

The data store 308 may also store crypto-ID data 314 used in the validation of the host computing device 102 as to the router 104 and network registrar 106, and the validation of the network 100 as to the host computing device 102. The crypto-ID data 314 may include crypto-IDs generated by the host computing device 102 or the network registrar 106 based on a hash of their respective CIPOs as described herein. The crypto-ID data 314 may include a host crypto-ID generated by, for example, the registration services 316 of the computer readable media 306. In one example, the crypto-ID data 314 may include a network crypto-ID provisioned or pre-provisioned by the network registrar 106 that identifies the network 100 that the host computing device 102 is intending to join and may be provided to the host computing device 102 by the network registrar 106 or other computing device that can confirm the authenticity of the network 100.

The computer-readable media 306 may store portions, or components, of registration services 316 described herein. For example, the registration services 316 of the computer-readable media 306 may include a neighbor solicitation (NS) component 318 to, when executed by the processor(s) 302, send a number of NS messages to the router 104. The NS component 318 may include within the NS messages an EARO, a ROVR, a CIPO, a nonce (e.g., NonceH), a NDPSO, and PKI key pairs, among other types of data.

In conjunction with the NS component 318, the registration services 316 may further include a cryptography component 320. The cryptography component 320 derives and provides the host crypto-ID for the host computing device 102. Further, the cryptography component 320 may receive and process data related to the crypto-ID of the host computing device and/or the network crypto-ID of the network registrar 106 in order to validate the host computing device 102 as to the router 104 and network registrar 106, and validate the network 100 as to the host computing device 102.

Figure 4:
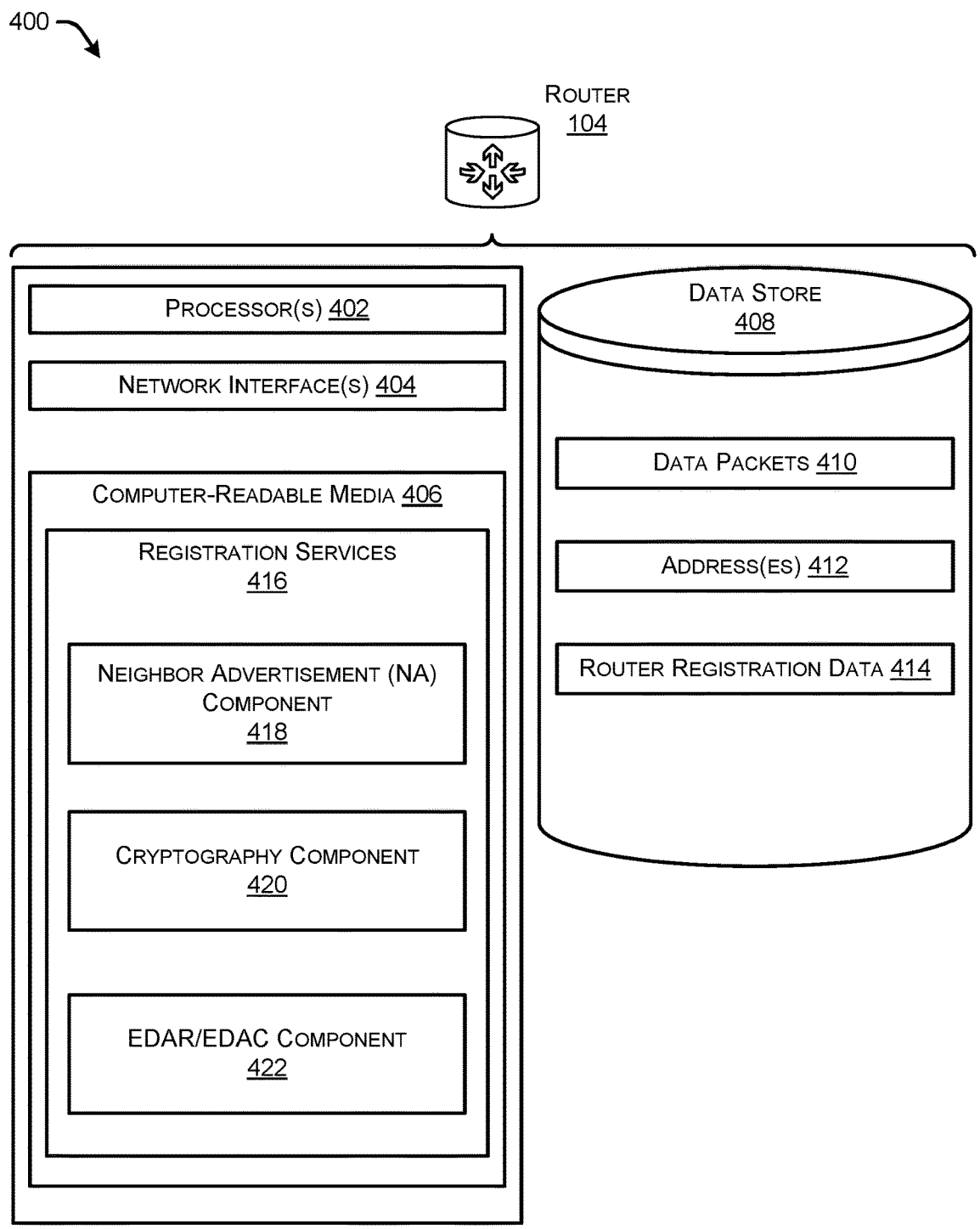
FIG. 4 is a component diagram of example components of a router within the network of FIG. 1, according to an example of the principles described herein.

FIG. 4 is a component diagram 400 of example components of a router 104 within the network 100 of FIG. 1, according to an example of the principles described herein. As illustrated, the router 104 may include one or more hardware processor(s) 402 configured to execute one or more stored instructions. The processor(s) 402 may comprise one or more cores. Further, the router 104 may include one or more network interfaces 404 configured to provide communications between the router 104 and other devices, such as the host computing device 102, the network registrar 106, and/or the server(s) 108. The network interface(s) 404 may include devices configured to couple to personal area networks (PANs), wired and wireless local area networks (LANs), wired and wireless wide area networks (WANs), and so forth. For example, the network interfaces 404 may include devices compatible with the wired and/or wireless communication technologies and protocols described herein.

The router 104 may also include computer-readable media 406 that stores various executable components (e.g., software-based components, firmware-based components, etc.). In addition to various components discussed herein, the computer-readable media 406 may further store components to implement functionality described herein. While not illustrated, the computer-readable media 406 may store one or more operating systems utilized to control the operation of the one or more devices that comprise the router 104. According to one example, the operating system comprises the LINUX operating system. According to another example, the operating system(s) comprise the WINDOWS SERVER operating system from MICROSOFT Corporation of Redmond, Wash. According to further examples, the operating system(s) may comprise the UNIX operating system or one of its variants. It may be appreciated that other operating systems may also be utilized.

Additionally, the router 104 may include a data store 408 which may comprise one, or multiple, repositories or other storage locations for persistently storing and managing collections of data such as databases, simple files, binary, and/or any other data. The data store 408 may include one or more storage locations that may be managed by one or more database management systems. The data store 408 may store, for example, data packets 410 for transmission to the host computing device 102, the network registrar 106, and/or the server(s) 108, among other networked computing devices. The data packets 410 may include data sent in a data session and within a data flow as described herein.

Further, the data store 408 may store a number of address(es) 412. The address(es) 412 may include any data defining an address of the host computing device 102 that may be used to validate the host computing device 102 to the router 104 and the network 100 as described herein. The router 104 may store the address(es) for validating and re-validating the host computing device 102. The address(es) 412 may also include a neighbor cache that stores a MAC address of the host computing device 102 and maps associated IP address to the MAC address. In this manner, the router 104 may use the neighbor cache stored in the address(es) of the data store 408 in order to initiate communication with the host computing device 102 as well as confirm that the host computing device 102 is the host computing device it states that it is in any subsequent communications and/or during any subsequent attempts by the host computing device 102 to join the network 100.

The data store 408 may also store router registration data 414 that includes registration data related to the registration of the host computing device 102 and other computing devices seeking to join the network 100. The router registration data 414 may also include any data associated with the nonces passed to and from the host computing device 102, the EARO, the EDAR, the EDAC, and/or PKI key pairs, as described herein.

The computer-readable media 406 may store portions, or components, of registration services 416 described herein. For example, the registration services 416 of the computer-readable media 406 may include a neighbor advertisement (NA) component 418 to, when executed by the processor(s) 402, send a number of NA messages to the host computing device 102. The NA component 418 may include within the NA messages an EARO challenge, a nonce (e.g., NonceR and/or NonceL), a CIPO, a network CIPO, and NDPSO, and a network NDPSO, among other types of data as described herein.

In conjunction with the NA component 418, the registration services 416 may further include a cryptography component 420. The cryptography component 420 may receive and process data related to the host crypto-ID of the host computing device 102 and a network crypto-ID of the network registrar 106 in order to validate the host computing device 102 as to the router 104 and network registrar 106, and validate the network 100 as to the host computing device. As described herein, the network crypto-ID belongs to the network registrar 106 and is derived from the public key of the network registrar 106 (e.g., the network public key). The network crypto-ID is provisioned or pre-provisioned in the host computing device 102 so that the host computing device 102 can check that the network public key is the expected one, and then, based on the NDPSO sent from the network registrar 106 at 210, that the network registrar 106 has the network private key that goes with the network public key.

Further, the registration services 416 may include an EDAR/EDAC component 422. The EDAR/EDAC component 422, when executed by the processor(s) 402, passes EDAR and EDAC messages as described herein.

Figure 5:
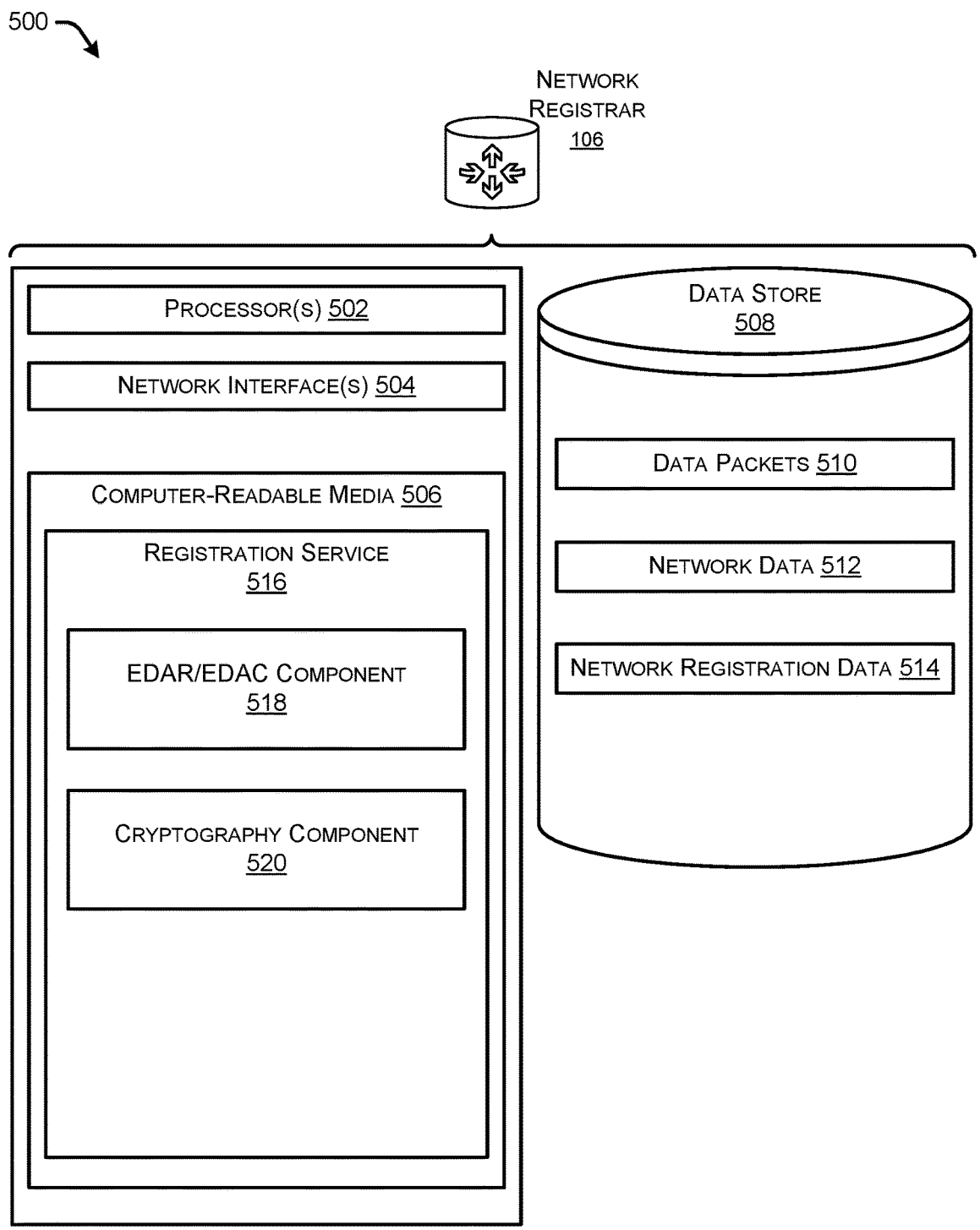
FIG. 5 is a component diagram of example components of a network registrar within the network of FIG. 1, according to an example of the principles described herein.

FIG. 5 is a component diagram 500 of example components of a network registrar 106 within the network 100 of FIG. 1, according to an example of the principles described herein. As illustrated, the network registrar 106 may include one or more hardware processor(s) 502, one or more devices, configured to execute one or more stored instructions. The processor(s) 502 may comprise one or more cores. Further, the network registrar 106 may include one or more network interfaces 504 configured to provide communications between the network registrar 106 and other devices, such as the host computing device 102, the network registrar 106, and/or the server(s) 108. The network interface(s) 504 may include devices configured to couple to personal area networks (PANs), wired and wireless local area networks (LANs), wired and wireless wide area networks (WANs), and so forth. For example, the network interfaces 504 may include devices compatible with the wired and/or wireless communication technologies and protocols described herein.

The network registrar 106 may also include computer-readable media 506 that stores various executable components (e.g., software-based components, firmware-based components, etc.). In addition to various components discussed herein, the computer-readable media 506 may further store components to implement functionality described herein. While not illustrated, the computer-readable media 506 may store one or more operating systems utilized to control the operation of the one or more devices that comprise the network registrar 106. According to one example, the operating system comprises the LINUX operating system. According to another example, the operating system(s) comprise the WINDOWS SERVER operating system from MICROSOFT Corporation of Redmond, Wash. According to further examples, the operating system(s) may comprise the UNIX operating system or one of its variants. It may be appreciated that other operating systems may also be utilized.

Additionally, the network registrar 106 may include a data store 508 which may comprise one, or multiple, repositories or other storage locations for persistently storing and managing collections of data such as databases, simple files, binary, and/or any other data. The data store 508 may include one or more storage locations that may be managed by one or more database management systems. The data store 508 may store, for example, data packets 510 for transmission to the host computing device 102, the router 104, and/or the server(s) 108, among other networked computing devices. The data packets 510 may include data sent in a data session and within a data flow as described herein.

Further, the data store 508 may store network data 512. The network data 512 may include any data that defines the topology of the network 100 and data defining the router(s) 106 and the host computing device 102. In one example, the network data 512 may include data defining the topology of the network 100, the nonce (e.g., NonceL) of the network registrar 106, the network crypto-ID, registration information defining the validation of the host computing device 102 within the network 100, among other data. Further, the data store 508 may store network registration data 514. The network registration data 514 may include the network crypto-ID of the network 100 that is used by the host computing device 102 to authenticate the network 100. Further, in one example, the network registration data 514 may include a number of address(es) defining the address(es) of the host computing device 102, crypto-IDs of the host computing device 102, a number of nonces (e.g., NonceR, NonceH, Nonce L), a EDAR messages, EDAC messages, and PM key pairs, among other types of data related to the registration of the host computing device 102 within the network 100.

The computer-readable media 506 may store portions, or components, of registration services 516 described herein. For example, the registration services 516 of the computer-readable media 506 may include a an EDAR/EDAC component 518. The EDAR/EDAC component 518, when executed by the processor(s) 502, passes EDAR and EDAC messages as described herein.

In conjunction with the EDAR/EDAC component 518, the registration services 516 may further include a cryptography component 520. The cryptography component 520 may provide the network crypto-ID to the host computing device 102 such that the host computing device 102 may provision or pre-provision the network crypto-ID to the host computing device 102. In the examples described herein, the network crypto-ID may be provided to the host computing device 102 from the network registrar 106 in any manner such that the host computing device 102 may use the network crypto-ID to validate the network 100 as to the host computing device 102. The cryptography component 520 may also receive and process data related to the host nonce (e.g., NonceH) received from the host computing device 102 in order to validate the network 100 as to the host computing device 102.

Figure 6:
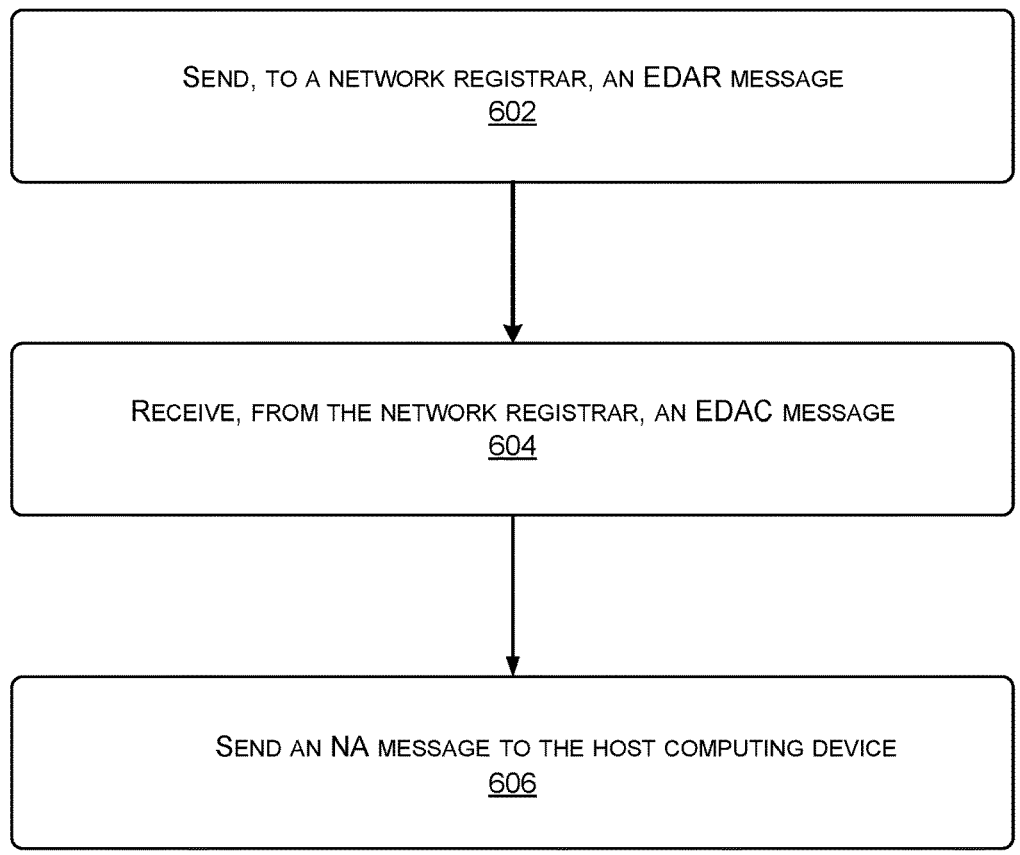
FIG. 6 illustrates a flow diagram of an example method of validating a network as to a host computing device, according to an example of the principles described herein.

FIG. 6 illustrates a flow diagram of an example method 600 of validating a network as to a host computing device 102, according to an example of the principles described herein. The method may include, at 602, sending, to a network registrar, an extended duplicate address request (EDAR) message including a nonce (e.g., NonceH) generated by the router 104 based on the second NS message sent by the host computing device 102 at 206 of FIG. 2. At 604, the router 104 receives, from the network registrar, an extended duplicate address confirmation (EDAC) message including a nonce (e.g., NonceL) generated by the network registrar 106. The nonce pair including the second nonce and the third nonce (e.g., NonceH and NonceL) is signed by the network registrar 106 via a private key of a public key infrastructure (PM) key pair of the network registrar 106 via a net-NDPSO. The EDAC message may be sent to the router 104. The router 104 obtains the nonce (e.g., NonceL) of the network registrar, the CIPO containing the public key, and the NDPSO containing the signature from the EDAC, and includes these elements in an NA message sent to the host computing device 102 at 606. The verification of the first signature indicates that the router 104 is not impersonating the network 100. In this manner, the host computing device 102 receives signed content that includes the nonce (e.g., NonceL) of the network registrar 106 for verification purposes. The host computing device 102 verifies the NA message and its contents using the public key when the host computing device 102 receives the NA message.

Figure 7:
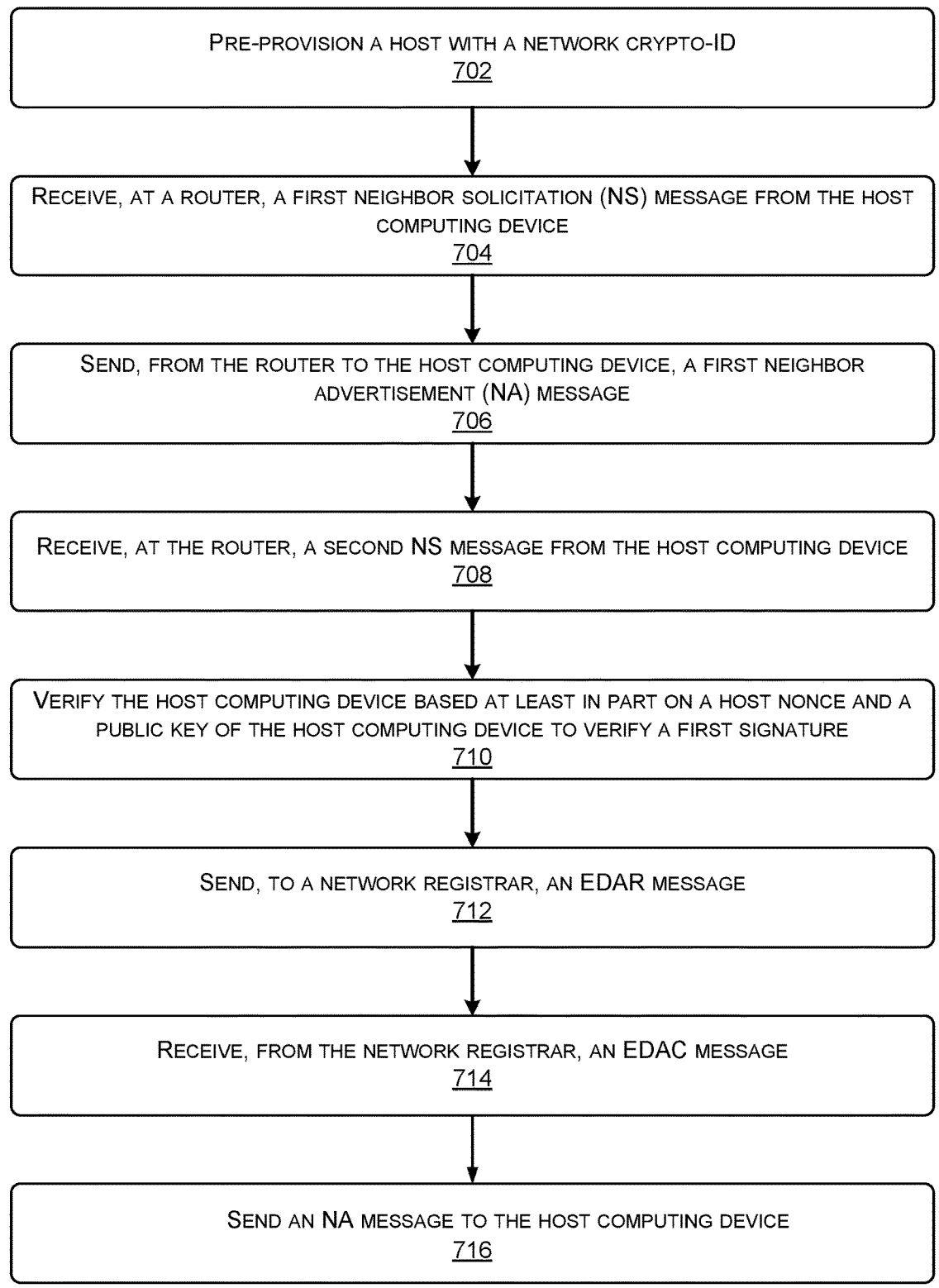
FIG. 7 illustrates a flow diagram of an example method of validating a host computing device as to a network and validating the network as to the host computing device, according to an example of the principles described herein.

FIG. 7 illustrates a flow diagram of an example method 700 of validating a host computing device 102 as to a network 100 and validating the network 100 as to the host computing device 102, according to an example of the principles described herein. The method of FIG. 7 may include pre-provisioning the host computing device 102 with the network crypto-ID at 702. The network crypto-ID is used to validate to the host computing device 102 that it is joining an intended network. The network crypto-ID may include a hash of the public key from the network registrar 106 that authenticates the network 100. Further, the network crypto-ID servs to verify that the public key in the CIPO included within the NA message is the expected public key. The associated private key of the PM key pair from the network registrar 106 is used in the signature by the network registrar 106. That private key is not shared.

At 704, the method 700 may include receiving, at the router 104, a first neighbor solicitation (NS) message from the host computing device 102. The first NS message includes an address of the host computing device 102 and a public key of a PM key pair of the host computing device 102. In one example, the first NS message may include an EARO including a registration ownership verifier (ROVR). The ROVR may include a host crypto-ID, the host crypto-ID verify that the host computing device 102 is the original registering node as described herein.

At 706, a first neighbor advertisement (NA) message may be sent from the router 104 to the host computing device 102. The first NA message may include a challenge to the address of the host computing device 102 and a nonce (e.g., NonceR) generated by the router 104.

The method at 708 may also include receiving, at the router 104, a second NS message from the host computing device 102 including the nonce (e.g., NonceH) generated by the host computing device 102. The host nonce (e.g., NonceH) is transmitted to the router 104. However, the pair of nonces (e.g., NonceR and NonceH) is signed. The signature by the host computing device 102 of the host nonce (e.g., NonceH) serves to ensure that the aggregate result of the pair of nonces (e.g., NonceR and NonceH) has never been previously used. In this manner, the host computing device 102 is in agreement with cryptographic processes where signature of distinct elements within a message may or should only be performed once.

The nonce (e.g., NonceH) generated by the host computing device 102 may be carried by a nonce option and signed by the host computing device 102 via a signature (e.g., an NDPSO). In the examples described herein, the network crypto-ID transmitted to the router 104 from the host computing device (the network crypto-ID being pre-provisioned to the host computing device 102) servs to verify that the public key in the CIPO in the NA message from the router 104 is the expected one. The NDPSO incudes the signature of the nonce pair (e.g., NonceH and NonceL). The nonce (e.g., NonceL) generated by the network registrar 106 may be carried in a nonce option. The other signature parameters including the public key are included in the CIPO. The public key is used to verify that the NA message was signed with the associated private key. This process proves that the host computing device 102 is joining the correct or intended network.

At 710, the method includes verifying the host computing device 102 based at least in part on the nonce (e.g., NonceH) and the public key of the host computing device 102 in order to verify the signature. The verification of the second signature indicates that the host computing device 102 is authentic. As mentioned above, the address of the host computing device 102 may include at least one of an internet protocol (IP) address of the host computing device 102, and a media access control address (MAC) address of the host computing device 102. The first NS message includes an extended address registration option (EARO), the EARO including a registration ownership verifier (ROVR), the ROVR including a host crypto-ID, the host crypto-ID verify that the host computing device 102 is the original registering node. The second NS message from the host computing device includes a CIPO including the network crypto-ID, the first nonce, and an NDPSO, the NDPSO carrying the first signature proving ownership of the network crypto-ID.

At 712, the method includes sending, to the network registrar 106, an extended duplicate address request (EDAR) message including a first nonce generated by the host computing device 102. The EDAR includes the host nonce (e.g., NonceH) generated by the host computing device 102. At 714, the method my include receiving, from the network registrar 106, the EDAC message including a third nonce (NonceL). The third nonce is generated by the network registrar 106. The EDAC message is signed by the network registrar 106 via a private key of a first public key infrastructure (PM) key pair of the registrar via a network NDPSO (e.g., net-NDPSO). The network registrar includes its nonce (e.g., NonceL) in the EDAC and signs the pair of nonces (e.g., NonceH and NonceL). Pair of nonces is signed because this signature serves as the challenge from the router 104 to the host computing device 102. The signature by the host computing device 102 of NonceH at 206 serves to ensure that the aggregate result of the pair of nonces (e.g., NonceH and NonceR) has never been used previously. When the network registrar 106 signs the pair of nonces (e.g., NonceH and NonceL), the role of NonceH changes as it becomes the challenge from the host to the network.

At 716, the router 104 may send the NA message to the host computing device 102. The NA message may include the nonce (e.g., NonceL) generated by the network registrar 106, and the public key of the registrar to verify the signature from the network registrar 106. The verification of the signature indicates to the host computing device 102 that the router 104 is not impersonating the network 100.

Figure 8:
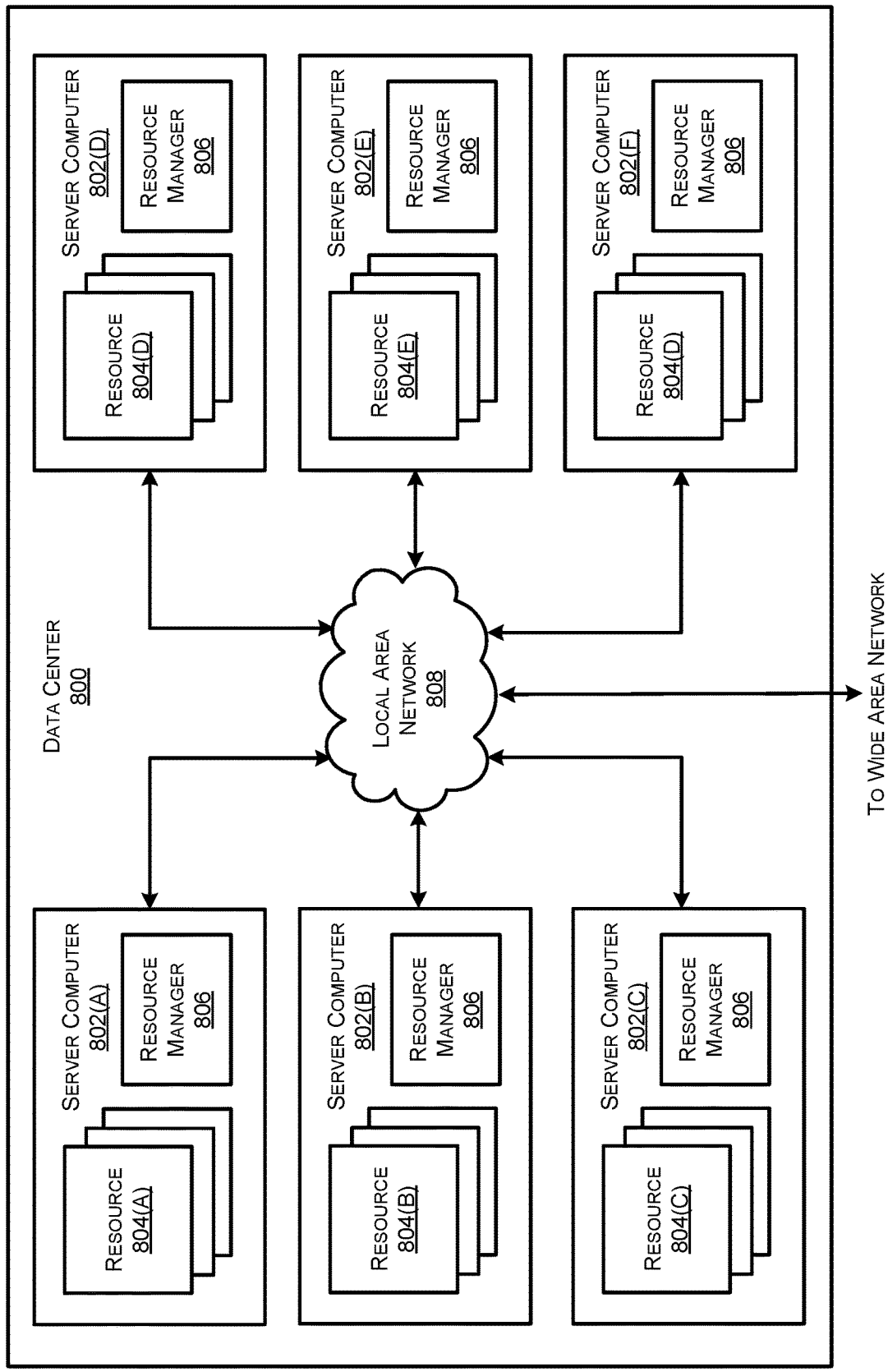
FIG. 8 illustrates a computing system diagram illustrating a configuration for a data center that can be utilized to implement aspects of the technologies disclosed herein.

FIG. 8 illustrates a computing system diagram illustrating a configuration for a data center 800 that can be utilized to implement aspects of the technologies disclosed herein. The example data center 800 shown in FIG. 8 includes several server computers 802A-802F (which might be referred to herein singularly as "a server computer 802" or in the plural as "the server computers 802) for providing computing resources. In some examples, the resources and/or server computers 802 may include, or correspond to, the any type of networked device described herein. Although described as servers, the server computers 802 may comprise any type of networked device, such as servers, switches, routers, hubs, bridges, gateways, modems, repeaters, access points, etc.

The server computers 802 can be standard tower, rackmount, or blade server computers configured appropriately for providing computing resources. In some examples, the server computers 802 may provide computing resources 804 including data processing resources such as VM instances or hardware computing systems, database clusters, computing clusters, storage clusters, data storage resources, database resources, networking resources, virtual private networks (VPNs), and others. Some of the servers 802 can also be configured to execute a resource manager 806 capable of instantiating and/or managing the computing resources. In the case of VM instances, for example, the resource manager 806 can be a hypervisor or another type of program configured to enable the execution of multiple VM instances on a single server computer 802. Server computers 802 in the data center 800 can also be configured to provide network services and other types of services.

In the example data center 800 shown in FIG. 8, an appropriate LAN 808 is also utilized to interconnect the server computers 802A-802F. It may be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 800, between each of the server computers 802A-802F in each data center 800, and, potentially, between computing resources in each of the server computers 802. It may be appreciated that the configuration of the data center 800 described with reference to FIG. 8 is merely illustrative and that other implementations can be utilized.

In some examples, the server computers 802 and or the computing resources 804 may each execute/host one or more tenant containers and/or virtual machines to perform techniques described herein.

In some instances, the data center 800 may provide computing resources, like tenant containers, VM instances, VPN instances, and storage, on a permanent or an as-needed basis. Among other types of functionality, the computing resources provided by a cloud computing network may be utilized to implement the various services and techniques described above. The computing resources 804 provided by the cloud computing network can include various types of computing resources, such as data processing resources like tenant containers and VM instances, data storage resources, networking resources, data communication resources, network services, VPN instances, and the like.

Each type of computing resource 804 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 804 not mentioned specifically herein.

The computing resources 804 provided by a cloud computing network may be enabled in one example by one or more data centers 800 (which might be referred to herein singularly as "a data center 800" or in the plural as "the data centers 800). The data centers 800 are facilities utilized to house and operate computer systems and associated components. The data centers 800 may include redundant and backup power, communications, cooling, and security systems. The data centers 800 can also be located in geographically disparate locations. One illustrative example for a data center 800 that can be utilized to implement the technologies disclosed herein will be described below with regard to FIG. 9.

Figure 9:
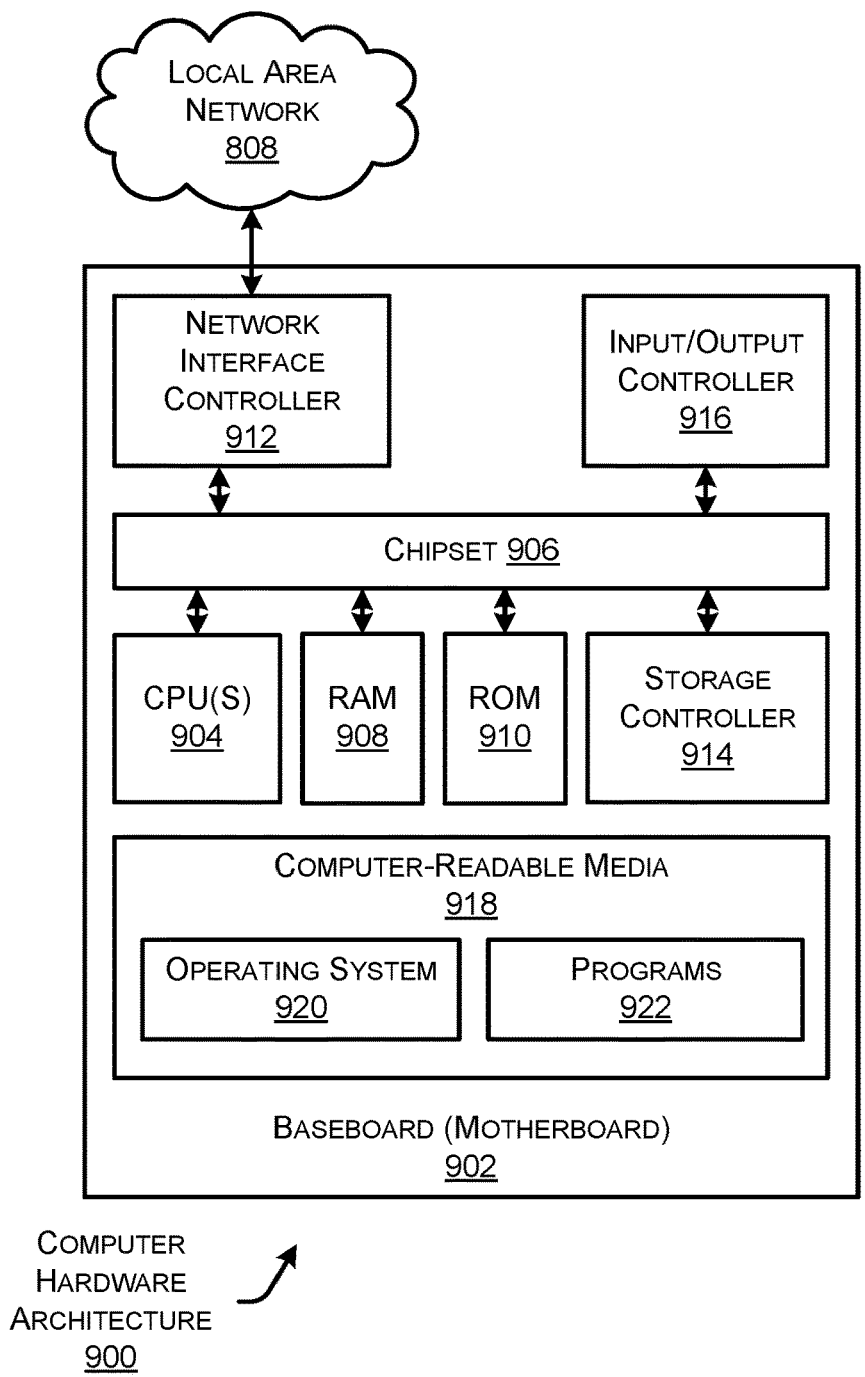
FIG. 9 illustrates a computer architecture diagram showing an example computer hardware architecture for implementing a computing device that can be utilized to implement aspects of the various technologies presented herein.

FIG. 9 illustrates a computer architecture diagram showing an example computer hardware architecture 900 for implementing a computing device that can be utilized to implement aspects of the various technologies presented herein. The computer hardware architecture 900 shown in FIG. 9 illustrates a server computer 802, network device (e.g., host computing device 102, router 104, network registrar 106, server(s) 108, data store, etc.), workstation, desktop computer, laptop, tablet, network appliance, e-reader, smartphone, or other computing device, and can be utilized to execute any of the software components presented herein. The computer 900 may, in some examples, correspond to a network device (e.g., the host computing device 102, router 104, network registrar 106, server(s) 108 described herein, and may comprise networked devices such as servers, switches, routers, hubs, bridges, gateways, modems, repeaters, access points, etc.

The computer 900 includes a baseboard 902, or "motherboard," which is a printed circuit board to which a multitude of components or devices can be connected by way of a system bus or other electrical communication paths. In one illustrative configuration, one or more central processing units (CPUs) 904 operate in conjunction with a chipset 906. The CPUs 904 can be standard programmable processors that perform arithmetic and logical operations necessary for the operation of the computer 900.

The CPUs 904 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 906 provides an interface between the CPUs 904 and the remainder of the components and devices on the baseboard 902. The chipset 906 can provide an interface to a RAM 908, used as the main memory in the computer 900. The chipset 906 can further provide an interface to a computer-readable storage medium such as a read-only memory (ROM) 910 or non-volatile RAM (NVRAM) for storing basic routines that help to startup the computer 900 and to transfer information between the various components and devices. The ROM 910 or NVRAM can also store other software components necessary for the operation of the computer 900 in accordance with the configurations described herein.

The computer 900 can operate in a networked environment using logical connections to remote computing devices and computer systems through a network, such as the network 100. The chipset 906 can include functionality for providing network connectivity through a Network Interface Controller (NIC) 912, such as a gigabit Ethernet adapter. The NIC 912 is capable of connecting the computer 900 to other computing devices over the network 100. It may be appreciated that multiple NICs 912 can be present in the computer 900, connecting the computer to other types of networks and remote computer systems. In some examples, the NIC 912 may be configured to perform at least some of the techniques described herein, such as packet redirects and/or other techniques described herein.

The computer 900 can be connected to a storage device 918 that provides non-volatile storage for the computer. The storage device 918 can store an operating system 920, programs 922, and data, which have been described in greater detail herein. The storage device 918 can be connected to the computer 900 through a storage controller 914 connected to the chipset 906. The storage device 918 can consist of one or more physical storage units. The storage controller 914 can interface with the physical storage units through a serial attached SCSI (SAS) interface, a serial advanced technology attachment (SATA) interface, a fiber channel (FC) interface, or other type of interface for physically connecting and transferring data between computers and physical storage units.

The computer 900 can store data on the storage device 918 by transforming the physical state of the physical storage units to reflect the information being stored. The specific transformation of physical state can depend on various factors, in different examples of this description. Examples of such factors can include, but are not limited to, the technology used to implement the physical storage units, whether the storage device 918 is characterized as primary or secondary storage, and the like.

For example, the computer 900 can store information to the storage device 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 can further read information from the storage device 918 by detecting the physical states or characteristics of one or more particular locations within the physical storage units.

In addition to the storage device 918 described above, the computer 900 can have access to other computer-readable storage media to store and retrieve information, such as program modules, data structures, or other data. It may be appreciated by those skilled in the art that computer-readable storage media is any available media that provides for the non-transitory storage of data and that can be accessed by the computer 900. In some examples, the operations performed by the network 100 and or any components included therein, may be supported by one or more devices similar to computer 900. Stated otherwise, some or all of the operations performed by the network 100, and or any components included therein, may be performed by one or more computer devices 900 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 918 can store an operating system 920 utilized to control the operation of the computer 900. According to one example, the operating system 920 comprises the LINUX operating system. According to another example, the operating system comprises the WINDOWS® SERVER operating system from MICROSOFT Corporation of Redmond, Wash. According to further examples, the operating system can comprise the UNIX operating system or one of its variants. It may be appreciated that other operating systems can also be utilized. The storage device 918 can store other system or application programs and data utilized by the computer 900.

In one example, the storage device 918 or other computer-readable storage media is encoded with computer-executable instructions which, when loaded into the computer 900, transform the computer from a general-purpose computing system into a special-purpose computer capable of implementing the examples described herein. These computer-executable instructions transform the computer 900 by specifying how the CPUs 904 transition between states, as described above. According to one example, the computer 900 has access to computer-readable storage media storing computer-executable instructions which, when executed by the computer 900, perform the various processes described above with regard to FIGS. 1-7. The computer 900 can also include computer-readable storage media having instructions stored thereupon for performing any of the other computer-implemented operations described herein.

The computer 900 can also include one or more input/output controllers 916 for receiving and processing input from a number of input devices, such as a keyboard, a mouse, a touchpad, a touch screen, an electronic stylus, or other type of input device. Similarly, an input/output controller 916 can provide output to a display, such as a computer monitor, a flat-panel display, a digital projector, a printer, or other type of output device. It will be appreciated that the computer 900 might not include all of the components shown in FIG. 9, can include other components that are not explicitly shown in FIG. 9, or might utilize an architecture completely different than that shown in FIG. 9.

As described herein, the computer 900 may comprise one or more of a host computing device 102, router(s) 104, a network registrar 106, server(s) 108, or a network device (e.g., server computer 802, computing resource, router, etc.). The computer 900 may include one or more hardware processor(s) such as the CPUs 904 configured to execute one or more stored instructions. The CPUs 904 may comprise one or more cores. Further, the computer 900 may include one or more network interfaces configured to provide communications between the computer 900 and other devices, such as the communications described herein as being performed by the host computing device 102, router(s) 104, a network registrar 106, server(s) 108, or a network device, or other computing device. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 922 may comprise any type of programs or processes to perform the techniques described in this disclosure for validating a host computing device 102 relative to a router 104, and validating to the host computing device that it has joined an intended network. The programs 922 may enable the host computing device 102, router(s) 104, a network registrar 106, server(s) 108, and/or a network device to perform various operations.

While the present systems and methods are described with respect to the specific examples, it is to be understood that the scope of the present systems and methods are not limited to these specific examples. Since other modifications and changes varied to fit particular operating requirements and environments will be apparent to those skilled in the art, the present systems and methods are not considered limited to the example chosen for purposes of disclosure, and covers all changes and modifications which do not constitute departures from the true spirit and scope of the present systems and methods.

Although the application describes examples having specific structural features and/or methodological acts, it is to be understood that the claims are not necessarily limited to the specific features or acts described. Rather, the specific features and acts are merely illustrative some examples that fall within the scope of the claims of the application.

What is claimed is:

1. A method comprising:
sending, to a network registrar, an extended duplicate address request (EDAR) message including a first nonce generated by a host computing device;
receiving, from the network registrar, an extended duplicate address confirmation (EDAC) message including a second nonce and a first signature, a first nonce pair including the first nonce and the second nonce being signed by the network registrar via a private key of a first public key infrastructure (PM) key pair of the network registrar via the first signature; and
sending a first neighbor advertisement (NA) message to the host computing device including the second nonce, wherein the second nonce and a public key of the network registrar verifies the first signature from the network registrar, the verification of the first signature indicating that a router through which the host computing device connects to a network is not impersonating the network.

2. The method of claim 1, wherein the first NA message includes a network crypto-identification parameters option (CIPO) defining a network cryptographic identifier (crypto-ID), the network crypto-ID being derived from a public key of the first PKI key pair.

3. The method of claim 2, further comprising:
pre-provisioning the host computing device with the network crypto-ID as an identification of the network that the host computing device is to join,
wherein sending the first NA message to the host computing device includes sending to the host computing device the public key to validate that the public key corresponds to the network crypto-ID, and that the first signature corresponds with the private key that forms the first PM key pair with the public key.

4. The method of claim 2, wherein the first signature signs the network crypto-ID via a neighbor discovery protocol signature option (NDPSO).

5. The method of claim 1, further comprising:
receiving, at the router, a first neighbor solicitation (NS) message from the host computing device, the first NS message including:
an address of the host computing device, and
a public key of a second PM key pair of the host computing device;
sending, from the router to the host computing device, a second neighbor advertisement (NA) message including:
a challenge to the address of the host computing device, and
a third nonce generated by the router;
receiving, at the router, a second NS message from the host computing device including the first nonce and a second signature, a second nonce pair including the first nonce and the second nonce being signed by the host computing device via the second signature; and
verifying the host computing device based at least in part on the first nonce and the public key of the host computing device to verify the second signature, the verification of the second signature indicating that the host computing device is authentic.

6. The method of claim 5, wherein the address of the host computing device includes at least one of an internet protocol (IP) address of the host computing device, and a media access control address (MAC) address of the host computing device.

7. The method of claim 5, wherein the first NS message includes an extended address registration option (EARO), the EARO including a registration ownership verifier (ROVR), the ROVR including a host crypto-ID.

8. The method of claim 7, wherein the second NS message from the host computing device includes a CIPO including the host crypto-ID, the first nonce, and an NDPSO, the NDPSO carrying the first signature proving ownership of the host crypto-ID.

9. A non-transitory computer-readable medium storing instructions that, when executed, cause one or more processors to perform operations, comprising:
sending, to a network registrar, an extended duplicate address request (EDAR) message including a first nonce generated by a host computing device;
receiving, from the network registrar, an extended duplicate address confirmation (EDAC) message including a second nonce and a first signature, a first nonce pair including the first nonce and the second nonce being signed by the network registrar via a private key of a first public key infrastructure (PM) key pair of the network registrar via the first signature; and
sending a first neighbor advertisement (NA) message to the host computing device including the second nonce,
wherein the second nonce and a public key of the network registrar verifies the first signature from the network registrar, the verification of the first signature indicating that a router through which the host computing device connects to a network is not impersonating the network.

10. The computer-readable medium of claim 9, wherein the first NA message includes a network crypto-identification parameters option (CIPO) defining a network cryptographic identifier (crypto-ID), the network crypto-ID being derived from the public key of the first PM key pair.

11. The computer-readable medium of claim 10, the operations further comprising:
pre-provisioning the host computing device with the network crypto-ID as an identification of the network that the host computing device is to join,
wherein sending the first NA message to the host computing device includes sending to the host computing device the public key to validate that the public key corresponds to the network crypto-ID, and that the first signature corresponds with the private key that forms the first PM key pair with the public key.

12. The computer-readable medium of claim 10, wherein the first signature signs the network crypto-ID via a neighbor discovery protocol signature option (NDPSO).

13. The computer-readable medium of claim 9, the operations further comprising:
receiving, at the router, a first neighbor solicitation (NS) message from the host computing device, the first NS message including:
an address of the host computing device, and
a public key of a second PM key pair of the host computing device;
sending, from the router to the host computing device, a second neighbor advertisement (NA) message including:
a challenge to the address of the host computing device, and
a third nonce generated by the router;
receiving, at the router, a second NS message from the host computing device including the first nonce and a second signature, a second nonce pair including the first nonce and the second nonce being signed by the host computing device via the second signature; and
verifying the host computing device based at least in part on the first nonce and the public key of the host computing device to verify the second signature, the verification of the second signature indicating that the host computing device is authentic.

14. The computer-readable medium of claim 13, the operations further comprising adding the network crypto-ID to the second NS message and the EDAR message as an additional message option,
wherein the network registrar groups the host computing device based at least in part on a network crypto token assigned to the host computing device to correlate the host computing device to a first group, and
wherein the network registrar assigns an access right to the first group to control access of the host computing device.

15. The computer-readable medium of claim 14, the operations further comprising:
with the router, inspecting the EDAR message for the network crypto token assigned to the host computing device, the network crypto token grouping the host computing device into the first group;
granting to the host computing device the access right assigned to the first group; and
controlling the access to the network of the host computing device based on the granted access right.

16. The computer-readable medium of claim 15, wherein the second NS message from the host computing device includes a CIPO including the host crypto-ID, the first nonce, and an NDPSO, the NDPSO carrying the first signature proving ownership of the host crypto-ID.

17. A system, comprising:
a router; and
a network registrar communicatively coupled to the router;
the router including:
one or more processors; and
one or more non-transitory computer-readable media storing instructions that, when executed by the one or more processors, cause the one or more processors to perform operations comprising:
sending, to a network registrar, an extended duplicate address request (EDAR) message including a first nonce generated by a host computing device;
receiving, from the network registrar, an extended duplicate address confirmation (EDAC) message including a second nonce and a first signature, a first nonce pair including the first nonce and the second nonce being signed by the network registrar via a private key of a first public key infrastructure (PM) key pair of the network registrar via the first signature; and
sending a first neighbor advertisement (NA) message to the host computing device including the second nonce, wherein the second nonce and a public key of the network registrar verifies the first signature from the network registrar, the verification of the first signature indicating that a router through which the host computing device connects to a network is not impersonating the network.

18. The system of claim 17, the operations further comprising:
receiving, at the router, a first neighbor solicitation (NS) message from the host computing device, the first NS message including:
an address of the host computing device, and
a public key of a second PM key pair of the host computing device;
sending, from the router to the host computing device, a second neighbor advertisement (NA) message including:
a challenge to the address of the host computing device, and
a third nonce generated by the router;
receiving, at the router, a second NS message from the host computing device including the first nonce and a second signature, a second nonce pair including the first nonce and the second nonce being signed by the host computing device via the second signature; and
verifying the host computing device based at least in part on the first nonce and the public key of the host computing device to verify the second signature, the verification of the second signature indicating that the host computing device is authentic.

19. The system of claim 17, wherein the first NA message includes a network crypto-identification parameters option (CIPO) defining a network cryptographic identifier (crypto-ID), the network crypto-ID being derived from the public key of the first PM key pair.

20. The system of claim 18, the operations further comprising:
pre-provisioning the host computing device with the network crypto-ID as an identification of the network that the host computing device is to join,
wherein sending the first NA message to the host computing device includes sending to the host computing device the public key to validate that the public key corresponds to the network crypto-ID, and that the first signature corresponds with the private key that forms the first PM key pair with the public key, and
wherein the first signature signs the CIPO via a neighbor discovery protocol signature option (NDPSO).

* * * * *